United States Patent
Uehara et al.

(10) Patent No.: US 8,424,962 B2
(45) Date of Patent: Apr. 23, 2013

(54) SUNROOF DEVICE

(75) Inventors: Tatsuaki Uehara, Sakura (JP); Akira Murasawa, Sakura (JP); Ayumi Mihashi, Sakura (JP)

(73) Assignee: Yachiyo Industry Co., Ltd., Sayama-Shi, Saitama (JP)

( * ) Notice: Subject to any disclaimer, the term of this patent is extended or adjusted under 35 U.S.C. 154(b) by 0 days.

(21) Appl. No.: 13/239,881

(22) Filed: Sep. 22, 2011

(65) Prior Publication Data

US 2012/0068503 A1 Mar. 22, 2012

(30) Foreign Application Priority Data

Sep. 22, 2010 (JP) ................... 2010-211574
Sep. 22, 2010 (JP) ................... 2010-211575
Oct. 13, 2010 (JP) ................... 2010-230233
Oct. 25, 2010 (JP) ................... 2010-238705
Oct. 25, 2010 (JP) ................... 2010-238824

(51) Int. Cl.
*B60J 7/057* (2006.01)
*B60J 7/047* (2006.01)

(52) U.S. Cl.
USPC .............. 296/216.02; 296/216.03; 296/223

(58) Field of Classification Search ...... 296/296.01–224
See application file for complete search history.

(56) References Cited

U.S. PATENT DOCUMENTS

| | | | |
|---|---|---|---|
| 3,016,263 A | | 1/1962 | Rehmann |
| 4,272,124 A | * | 6/1981 | Schatzler et al. ............. 296/222 |
| 4,995,665 A | * | 2/1991 | Ichinose et al. ............... 296/213 |
| 6,942,284 B2 | * | 9/2005 | Manders et al. .............. 296/213 |
| 7,178,862 B2 | * | 2/2007 | Oechel ..................... 296/216.02 |
| 2002/0021031 A1 | | 2/2002 | Radmanic et al. |
| 2005/0110307 A1 | | 5/2005 | Grimm et al. |
| 2005/0127719 A1 | | 6/2005 | Sawada et al. |
| 2005/0231007 A1 | | 10/2005 | Oechel |
| 2008/0191519 A1 | | 8/2008 | Sawada et al. |

FOREIGN PATENT DOCUMENTS

| | | |
|---|---|---|
| DE | 103 48 545 A1 | 5/2005 |
| DE | 10 2005 007 032 A1 | 8/2006 |
| EP | 1 533 159 A1 | 5/2005 |
| EP | 1 586 475 A2 | 10/2005 |
| EP | 1741588 A1 | 1/2007 |
| JP | 01-093122 | 6/1989 |
| JP | 05-092721 | 4/1993 |
| JP | 2005-092721 | 4/1993 |

(Continued)

OTHER PUBLICATIONS

European Search Report application No. 11182353.0 dated Dec. 1, 2011.

*Primary Examiner* — Dennis Pedder
(74) *Attorney, Agent, or Firm* — Squire Sanders (US) LLP

(57) ABSTRACT

A sunroof device which includes a roof panel that is openable/closable, a front slider that is connected to the roof panel via a pin engaging unit that is comprised of the first lift guide groove and the first lift guide pin, a rear slider that is connected to the roof panel via a pin engaging unit that is comprised of a second lift guide groove and a second lift guide pin, and a driving motor that drives the front slider and the rear slider, wherein the first lift guide pin is positioned in the second horizontal stroke which is a horizontal groove and the second lift guide pin is positioned in the second horizontal stroke that is a horizontal groove when the roof panel is completely tilted up.

21 Claims, 14 Drawing Sheets

FOREIGN PATENT DOCUMENTS

| | | |
|---|---|---|
| JP | 10-029433 | 2/1998 |
| JP | 2010-029433 | 2/1998 |
| JP | 2002-052932 | 2/2002 |
| JP | 2005-041362 | 2/2005 |
| JP | 2005-41362 A | 2/2005 |
| JP | 2005-112164 A | 4/2005 |
| JP | 2005-153803 | 6/2005 |
| JP | 2005-162063 | 6/2005 |

* cited by examiner

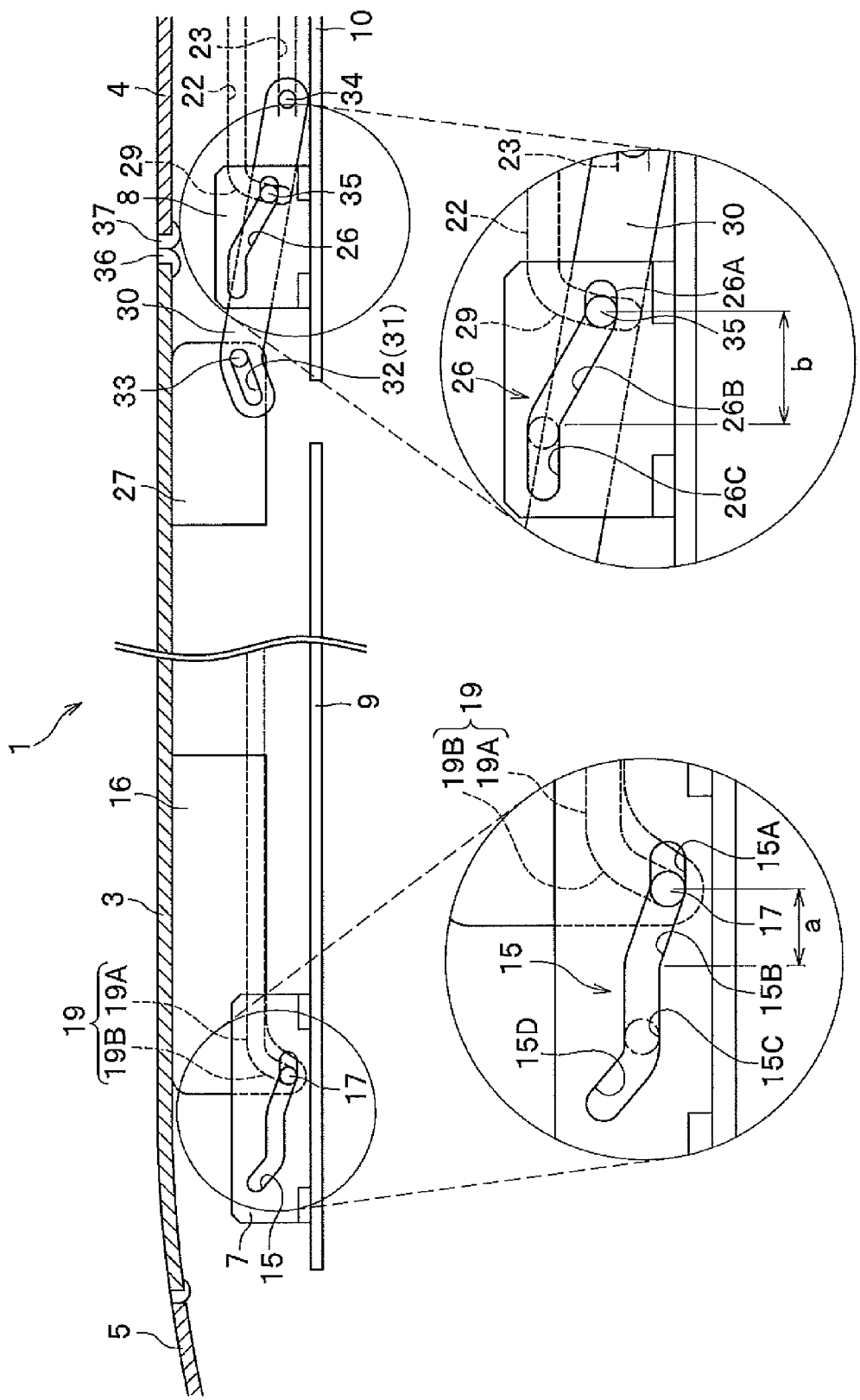

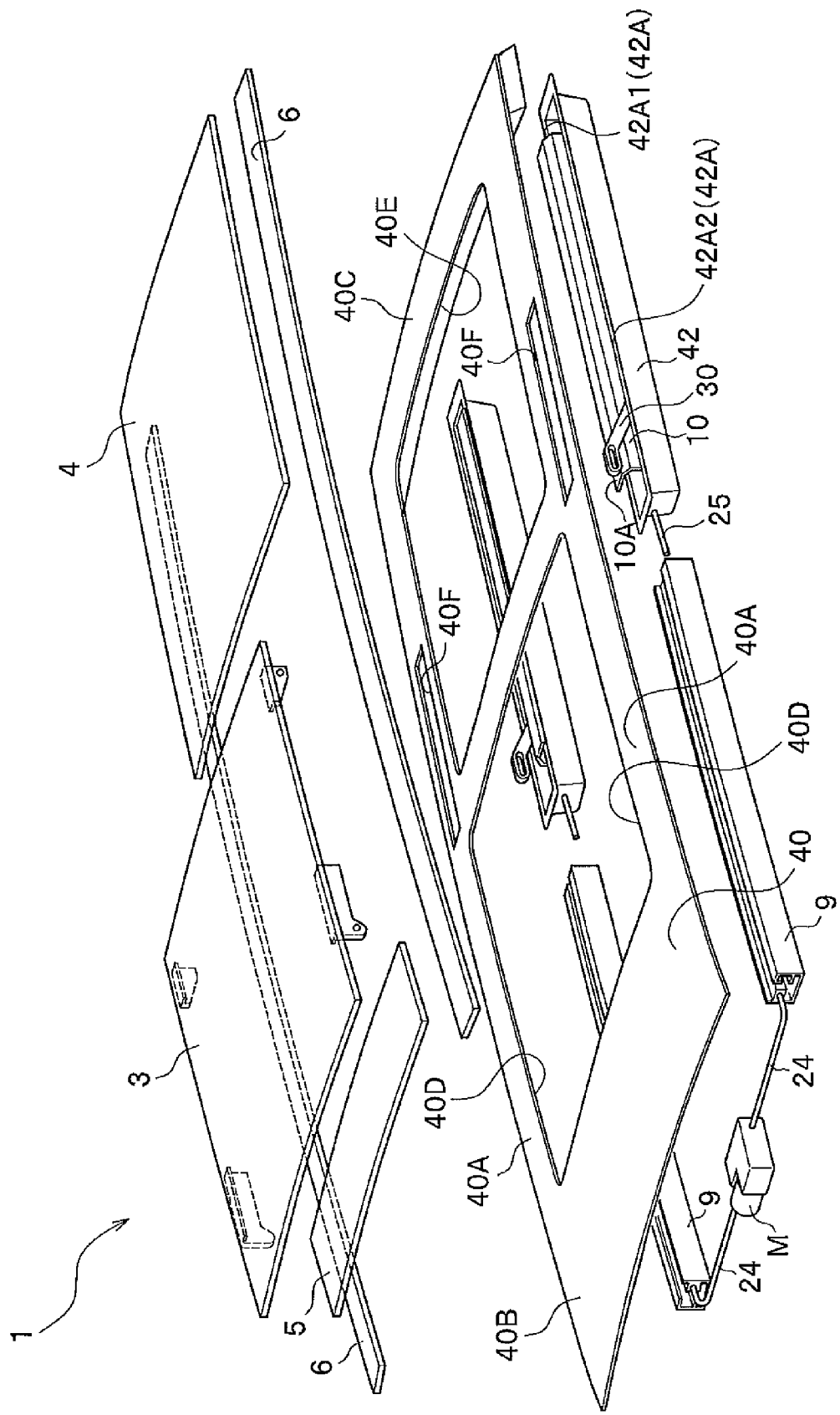

SUNROOF DEVICE

CROSS REFERENCE TO RELATED APPLICATIONS

This application claims the foreign priority benefit under 35 U.S.C. §119 of Japanese Patent Application No. 2010-211574 filed on Sep. 22, 2010, Japanese Patent Application No. 2010-211575 filed on Sep. 22, 2010, Japanese Patent Application No. 2010-230233 filed on Oct. 13, 2010, Japanese Patent Application No. 2010-238824 filed on Oct. 25, 2010 and Japanese Patent Application No. 2010-238705 filed on Oct. 25, 2010, the disclosure of which is incorporated herein by reference.

BACKGROUND OF THE INVENTION

1. Field of the Invention

The present invention relates to a sunroof device for a vehicle.

2. Description of the Related Arts

A sunroof device disclosed in European Patent Application Publication No. 1741588 A1 has been known as a conventional sunroof device including a roof panel that is openable and closable and front and rear sliders which are connected to front and rear parts of the roof panel, respectively, through pin engaging units each of which is comprised of a lift guide groove and a lift guide pin that is slid along the lift guide groove, wherein the front slider and the rear slider is capable of tilting up the roof panel by the pressing action of the moving pin engaging units.

In the sunroof device disclosed in European Patent Application Publication No. 1741588 A1, the lift guide pin formed on the roof panel is slidably engaged with the lift guide groove of the front slider, a tilt lever is interposed between the roof panel and the rear slider and the lift guide pin formed in the tilt lever is slidably engaged with the lift guide groove of the rear slider. When the front slider and the rear slider are moved rearward from a state where the roof panel is completely closed, the lift guide grooves presses respective lift guide pins to tilt up the roof panel.

More specifically, the tilt lever has such a structure that one end thereof is rotatably connected to the roof panel, a pin (a first guide pin) at the other end thereof is connected to a groove (a first guide curve) of the rear slider and a lift guide pin (a second guide pin) of the mid portion thereof is slidably engaged with a lift guide groove (a second guide curve) of the rear slider. When the rear slider is moved rearward from the state the sunroof panel is completely closed, the tilt lever is raised to tilt up the rear end of the roof panel.

Unexamined Japanese Patent Application Publication No. 2005-41362 discloses a structure where left and right guide rails (side frames) are integrally connected with each other by a front frame and a rear frame which extend in the vehicle width direction. As an integrated rectangular frame is comprised of these left and right guide rails, the front frame and the rear frame, the rigidity of the sunroof device is improved.

Sunroof devices have the following types: an inner sliding type in which the roof panel is slid rearward such that the roof panel is drawn inside of the fixed roof; and an outer sliding type in which the roof panel is moved above the fixed roof and is then slid rearward. In the outer sliding type, it is easier to secure a cabin space than in the inner sliding type. Further, in the outer sliding type, it is easier to make the roof panel larger than in the inner sliding type if sliders are provided at front and rear parts of the roof panel. As a sunroof device of the outer sliding type, a sunroof device has been known in which actions of the front and rear sliders for moving the roof panel in the up-down direction are made different to smoothly perform the tilt operation (see Unexamined Japanese Patent Application Publication No. 2002-52932, Japanese Patent No. 3982487 and Japanese Patent No. 4367109).

In a method for determining a tilt-up completion position of the roof panel by the regulation of a stopper, there has been a problem that a structure for mounting the stopper is complicated and a collision sound is generated. Therefore, a method has been generally used in which the tilt-up completion position of the roof panel is determined by stopping the rotation of the driving motor for the front slider and the rear slider at a predetermined pulse count value. If the position of the roof panel is displaced with respect to the pulse count value of the driving motor due to an external load or the like, however, the roof panel may not reach the tilt up completion position when the rotation of the driving motor is stopped.

In the structure disclosed in European Patent Application Publication No. 1741588 A1 for example, the lift guide pin of the front slider is positioned in an inclined part of the lift guide groove when the roof panel is completely tilted up, and thus, when the roof panel is displaced with respect to the pulse count value of the driving motor the height position of the lift guide pin is displaced by the vertical component of the inclined part, whereby variation of the tilt-up completion position of the roof panel is generated.

Due to the assembling error between the roof panel and the front slider and the rear slider, there has been a risk that the tilt-up completion position of the roof panel is varied depending on a product.

Furthermore, in the technique disclosed in European Patent Application Publication No. 1741588 A1, a pin (the first guide pin) at the other end thereof is slid in the groove of the rear slider (the first guide curve) when the tilt lever is raised. In this structure, however, as the tilt lever is being raised, a conversion efficiency at which the pressing force of the lift guide groove (the second guide curve) for pressing the lift guide pin (the second guide pin) is converted to the moving force for moving the pin (the first guide pin) is likely to be decreased and the raising operation of the tilt lever may not be performed smoothly.

Regarding the guide rail, it is preferable that each guide rail can be readily removed from a vehicle body separately for the purpose of their maintenance since the smooth movement of the slider may be obstructed if dust or the like is accumulated in the guide rail. In the conventional structure of the guide rail, however, left and right guide rails are integrally formed with the front frame and the rear frame, they can not be removed separately.

In a case of the large and heavy roof panel, an excessively large driving force is required at the time of a tilt operation (i.e. when the roof panel is moved upward from a closed position and when the roof panel is downward to the closed position after being moved horizontally in the closing direction). If there is not enough driving force, the roof panel can not be returned to a predetermined closed position and a gap may be generated between the roof panel and the fixed roof. Especially, when either one of the front and rear sliders is driven, the tilt operation by the follower side slider is difficult to be performed. Further, it is preferable that the front and rear guide rails have unique cross sectional shapes respectively to obtain a mechanism where the front and rear sliders can respectively perform the optimum tilt operation in order to more smoothly tilt the roof panel that is opened from or closed to the fixed roof in a sealed state.

The height position of the roof panel when the roof panel is completely closed is especially important in the external appearance quality. Thus, the roof panel needs to be mounted such that the roof panel is smoothly continued to the fixed roof of the vehicle. Conventionally, the height position of the roof panel is adjusted by a shim adjustment, however, the shim adjustment is cumbersome because handling the shim is troublesome.

The present invention is made in view of the above problems, and an object thereof is to provide a sunroof device that can keep the roof panel in a regular tilt-up completion position even if the roof panel is displaced or has an assembling error or the like.

Another object of the present invention is to provide a sunroof device in which the rising movement of the tilt lever (a link arm) is smooth.

Further, an object of the present invention is to provide a sunroof device in which left and right guide rails can be separately removed from a vehicle body while maintaining the rigidity of the sunroof device.

Moreover, an object of the present invention is to provide a sunroof device in which a roof panel can be smoothly moved even if the roof panel is made large.

Further, an object of the present invention is to provide a sunroof device which can easily perform the height adjustment of the roof panel.

SUMMARY OF THE INVENTION

A first aspect of the present invention provides a sunroof device including: a roof panel which is provided to a fixed roof of a vehicle with the roof panel being openable/closable; a front slider and a rear slider which are connected to a front part of the roof panel and a rear part of the roof panel, respectively, through pin engaging units each of which is comprised of a lift guide groove and a lift guide pin which is slid along the lift guide groove, wherein the front slider and the rear slider are moved together to tilt up the roof panel by the pressing action of the pin engaging units, and a driving motor which drives the front slider and the rear slider, wherein the lift guide groove includes in a part thereof a horizontal groove for a tilt up completion position, and the lift guide pin is positioned in the horizontal groove when the roof panel is completely tilted up.

In accordance with the sunroof device, even if the roof panel is displaced with respect to the pulse count value of the driving motor due to an external load or the like, the displacement is absorbed by the lateral sliding movement of lift guide pins in respective horizontal grooves since both of the two lift guide pins are positioned in the horizontal grooves. Similarly, even if there is an assembling error between the roof panel and the front slider and the rear slider, the error is absorbed by the lateral movement of the lift guide pins in the respective horizontal groove. Thus, the roof panel is positioned in a regular totally-closed position without generating a positional variation in the up-down direction.

In the aforementioned sunroof device, a horizontal stroke on a side of the front slider is set to be smaller than that of the lift guide pin on a side of the rear slider, the horizontal stroke of each lift guide pin being a stroke from a position when the roof panel is completely closed to a position when the roof panel is completely tilted up, and the lift guide pin on the side of the front slider is positioned in the horizontal groove earlier than the lift guide pin on the side of the rear slider when the roof panel is being tilted up.

The tilt up of the roof panel is carried out mainly for cabin ventilation. Therefore, the rear edge of the roof panel is raised to form a predetermined opening part while the front edge of the roof panel does not form an opening between the roof panel and the fixed roof to prevent the traveling wind or rainwater or the like from being entered. However, if the front edge of the roof panel is not raised at all and only the rear edge of the roof panel is raised, the rear edge of the roof panel is raised in an arc shape of which center is the front edge of the roof panel. Thus, the front edge of the roof panel (more specifically, a whether strip attached to the front edge) may be twisted to and scraped against the edge of the roof on the vehicle body side, whereby an excessive load may be applied to the front edge. In contrast, by slightly raising the front edge of the roof panel to the extent that the front edge of the roof panel does not form an opening between the roof on the vehicle body side, the roof panel can be moved upward substantially in parallel at the initial stage of the tilt up operation. This solves the problem that the front edge of the roof panel is twisted. Even in this structure, however, as the front edge of the roof panel is raised such that the front edge thereof does not form an opening with the roof on the vehicle body side, the front edge of the roof panel is slightly scraped against the roof on the vehicle body side.

In view of the above problem, a horizontal stroke of the lift guide pin from the position of the lift guide pin when the roof panel is completely closed to the rear end of the horizontal groove is a component for determining the operation time for tilting-up the roof panel. The shorter the horizontal stroke is, the shorter the time taken for the roof panel to be completely tilted up is. In the present invention, the horizontal stroke of the front slider is set smaller than that of the rear slider, and the lift guide pin on the front slider reaches the horizontal groove earlier than the lift guide pin on the rear slider at the time of tilt-up, whereby the operation time for tilting up the front edge of the roof panel is made shorter. With this structure, it is possible to shorten time in which the front edge of the roof panel is scraped against the roof on the vehicle body side, whereby the scraping sound can be reduced and the damage to the front edge of the roof panel can be decreased.

The aforementioned sunroof device further includes: a rear guide rail which guides the rear slider; and a link arm of which one end is rotatably connected to the roof panel via a first connecting pin and of which the other end is rotatably connected to the rear guide rail or the rear slider via a second connecting pin, wherein a mid portion of the link arm is slidably engaged with the lift guide groove of the rear slider via a lift guide pin, wherein the lift guide groove of the rear slider presses the lift guide pin by the movement of the rear slider to raise or lay down the link arm, and wherein the rear guide rail includes an arch shape pin guide groove of which center is approximately a position of the second connecting pin when the roof panel is completely closed, and the link arm is rotated to be raised or laid with its rotation center being the second connecting pin which is in a constant position, guided by the arch shape pin guide groove.

In accordance with the sunroof device in which the arch pin guide groove is formed in the rear guide rail and the link arm is rotated to be raised or fallen down by making the arch pin guide groove guide the link arm with the second connection pin whose position is made to be constant being its rotation center, the force of the second lift guide groove for pressing the lift guide pin can be efficiently converted to the force for raising the link arm without a need of the force for pulling the second connection pin frontward. Thus, the link arm can be smoothly raised from start to finish.

In the aforementioned sunroof device, the first connecting pin is slidably engaged with an escape groove which is formed in either one of the roof panel or the link arm.

In accordance with the sunroof device, it is possible to smoothly absorb the difference between the arch shape movement trajectory of the first connection pin with its rotation center being the second connection pin that is a constant position and a desired rising trajectory of the rear edge of the roof panel.

The aforementioned sunroof device further includes a pair of left and right rear guide rails which guide the rear slider; and a housing frame including a pair of side frame portions, a front frame portion which connects front ends of the side frame portions and a rear frame portion which connects rear ends of the side frame portions, the housing frame being fixed to a vehicle body frame; wherein the rear guide rail is detachably attached to a bottom surface of each side frame portion of the housing frame by fastening a bolt.

In accordance with the sunroof device, it is possible to ensure the rigidity of the entire sunroof device by providing the housing frame which includes a pair of side frame portions, the front frame portion and the rear frame portion. Further, it is also possible to remove the left or right rear guide rail individually to inspect or replace the left or right rear guide rail by detachably connecting the rear guide rail to the lower surface of the side frame member with the bolt.

The aforementioned sunroof device further includes further a drain cover which is detachably attached to the housing frame such that the drain cover covers opposite side surfaces and a bottom surface of the rear guide rail, wherein the drain cover is formed in a substantially hat shape having cover flanges on opposite edges of an upper opening of the drain cover, wherein at least one of the cover flanges is fastened to the housing frame together with a rail flange formed in the rear guide rail.

In accordance with the sunroof device, the drain cover is adapted to drain water drops which have fallen down. Therefore, the design flexibility of the cross sectional shape of the rear guide rail is improved, and the cross sectional shape of the rear guide rail can be simplified and downsized. Moreover, by fastening at least a part of the drain cover and the rear guide rail together to the housing frame to detachably attach the drain cover and the rear guide rail to the housing frame, the number of bolts for fastening the drain cover and the rear guide rail can be made smaller, whereby the attaching/detaching work time can be shortened.

The aforementioned sunroof panel further includes a link arm of which one end is rotatably connected to the roof panel via a first connecting pin, wherein the rear guide rail is removed from the housing frame with the rear slider being mounted on the rear guide rail by removing the first connecting pin.

In accordance with the sunroof device, it is possible to remove the rear guide rail with the rear slider being mounted on the rear guide rail, whereby the tilt mechanism including the rear slider can be easily inspected.

The aforementioned sunroof device further includes: a front guide rail which guides the front slider; a rear guide rail which guides the rear slider; and a push/pull cable which is inserted through each cable guide groove of the front guide rail and the rear guide rail and is pushed or pulled by the driving motor, wherein the push/pull cable is connected to both of the front slider and the rear slider, and a connection pipe which connects the cable guide grooves and covers the push/pull cable is provided between the front guide rail and the rear guide rail.

In accordance with the sunroof device, as both of the front slider and the rear slider are moved by the push/pull cable, the front slider and the rear slider can reliably move the front part of the roof panel up and down in a first form and move the rear part of the roof panel up and down in a second form, respectively. Further, as the front guide rail is comprised of members different from those of the rear guide rail, the shapes of the front guide rail and the rear guide rail can be formed individually such that the up-down movements of the roof panel in the first and second forms can be optimally performed by the front and rear guide rails, respectively. With the structure described above, the smooth tilting operation of the roof panel can be realized.

In the aforementioned sunroof device, the cable guide groove of the front guide rail is provided at a position lower than the cable guide groove of the rear guide rail In accordance with the sunroof device, as rain drops may be intruded even when the roof panel is completely closed, the cable groove is provided in a comparatively higher position to prevent the push/pull cable from being submerged in water. As there is scarcely any risk of the ingress of water in the front guide rail when the sunroof panel is completely closed, the cable groove is provided in a comparatively lower position where is close to the shoo of the front slider to make the sliding resistance of the front slider small.

In the aforementioned sunroof device, a panel bracket is attached to a lower surface of the roof panel, and the roof panel is connected to the front slider or the rear slider via a connecting pin attached to the panel bracket, the sunroof device further including: a position adjusting long hole which is bored through the panel bracket and is long in an up-down direction; a connecting nut including an engaging protruded portion which is slidably engaged with the position adjusting long hole; and a connecting bolt as the connecting pin which is screwed into the connecting nut to fasten the panel bracket.

In accordance with the sunroof device, a worker slidably engages the engaging protruded portion with the position adjusting long hole, brings the connecting nut in contact with the second panel bracket and screws the connecting bolt to the connecting nut to the extent the connecting bolt is temporarily fastened to the connecting nut. The engaging protruded portion is then slid in the up-down direction in the position adjusting long hole so that the roof panel in a completely-closed state is at the height at which the roof panel is smoothly continued to the fixed panel. Once the height position is determined, the connecting bolt is finally tightened. With the present invention, the height of the roof panel can be more easily adjusted than with a conventional height adjusting method using a shim.

In the aforementioned sunroof device, the panel bracket is provided with a bent piece portion which is bent after the connecting nut is slidably engaged with the position adjusting long hole to prevent the connecting nut from being dropped off.

In accordance with the sunroof device, the bent piece part is bent by a nipper or the like after the connecting nut is slidably engaged with the position adjusting long hole to prevent the connecting nut from being dropped off from the position adjusting long hole. If the bent piece part is not provided, a worker needs to hold the connecting nut with one of his hands and to screw the connecting bolt with the other one of his hands when the connecting bolt is screwed into the connecting nut. By providing the bent piece part, however, the worker does not need to hold the connecting nut, whereby an assembling work is made easier.

In accordance with the present invention, the roof panel is kept in a regular tilt up completion position without generating the position variation of the roof panel in the up-down direction.

In accordance with the present invention, a high quality sunroof device can be provided in which the rising movement of the link arm is smooth.

In accordance with the present invention, it is possible to remove the left and right rear guide rails individually from the vehicle body while ensuring the rigidity of the sunroof device, whereby the inspection or replacement of the rear guide rail can be performed easily.

In accordance with the present invention, a sunroof device can be provided which can smoothly operate the roof panel even if the roof panel is made large.

Further, in accordance with the present invention, height adjustment of the roof panel can be more easily performed than a conventional method using a shim.

BRIEF DESCRIPTION OF THE DRAWINGS

FIG. 5 is a side view showing a main part of the sunroof device of the present invention wherein the main part is enlarged.

FIG. 10 is an exploded perspective view showing main components of the sunroof device according to the present invention.

DETAILED DESCRIPTION OF THE PREFERRED EMBODIMENTS

An embodiment of a sunroof device 1 according to the present invention is described below with reference to the accompanying drawings. In the following description, a front-rear direction and a left-right direction are determined based on the traveling direction of a vehicle. When explaining a component which has a symmetrical structure, either one of the left one or the right one is described.

Figure 1A:
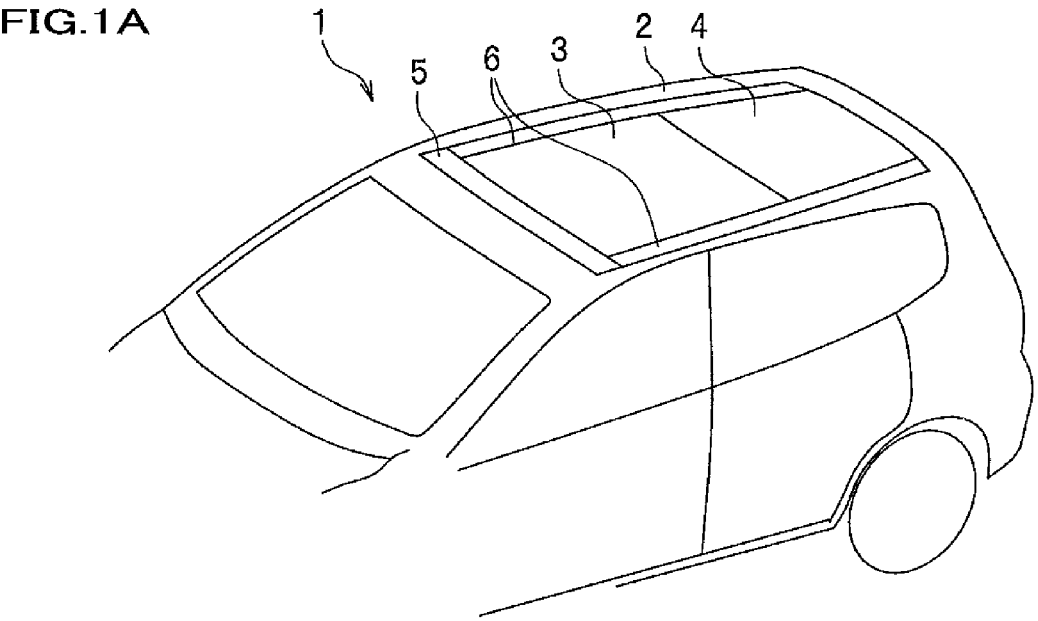
FIG. 1A is an external view showing a sunroof device according to the present invention with a roof panel being closed.
Figure 1B:
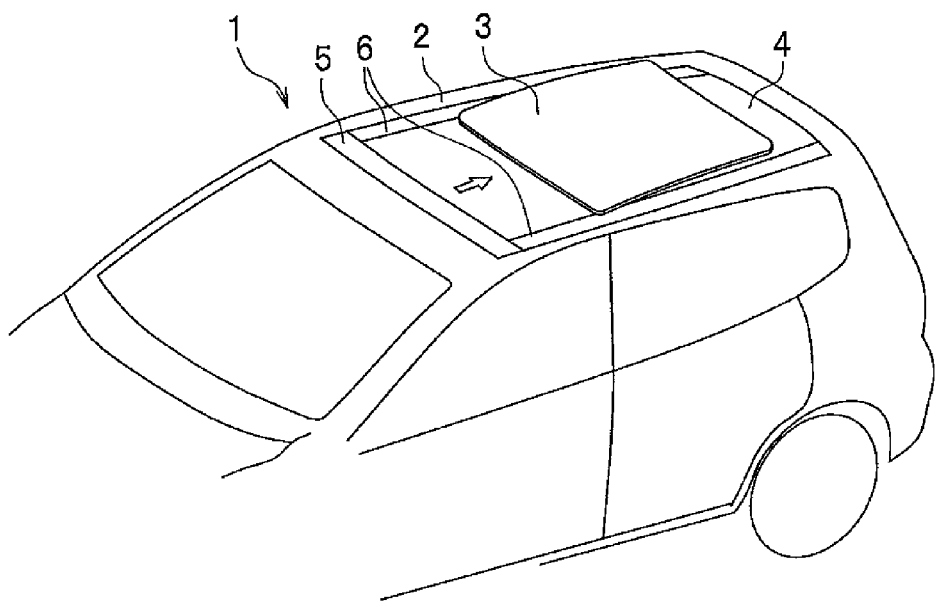
FIG. 1B is an external view showing the sunroof device according to the present invention with the roof panel being opened.
Figure 2:
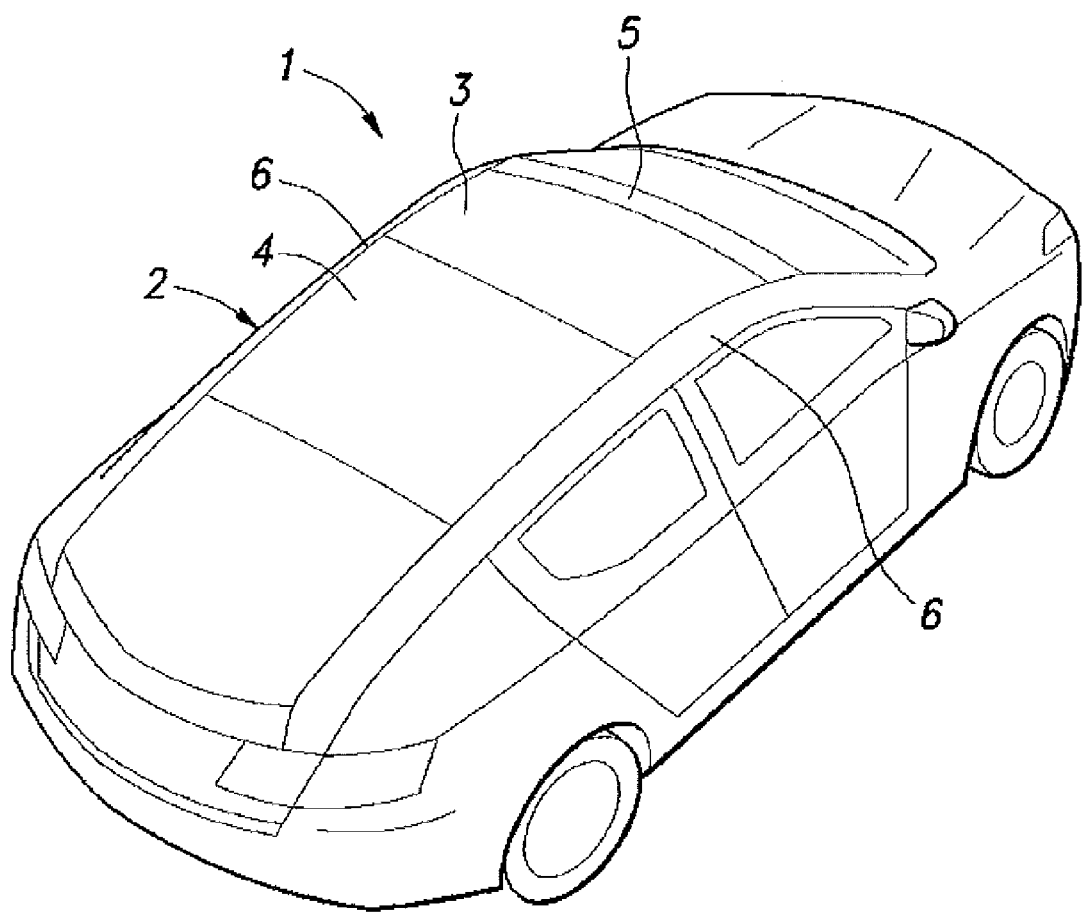
FIG. 2 is a rear external view showing another vehicle to which the sunroof device according to the present invention is applied.

As shown in FIG. 1, the sunroof device 1 according to the present invention is provided to a fixed roof 2 of a vehicle such that the sunroof device 1 is openable/closable. The sunroof device 1 is an outer sliding type sunroof device provided with a roof panel 3 which is tilted up and moved rearward when the roof panel 3 is opened. Further, a fixed panel 4 is attached to the fixed roof 2 such that the fixed panel 4 is positioned on the rear side of the roof panel 3, and a front garnish 5 that is long in the vehicle width direction is attached to the fixed roof 2 such that the front garnish 5 is positioned on the front side of the roof panel 3. A side garnish 6 that is long in the front-rear direction is attached to the fixed roof 2 such that the side garnish 6 is positioned on opposite sides of the roof panel 3 and the fixed panel 4. The fixed panel 4, the front garnish 5 and the side garnish 6 are all fixed to the fixed roof 2. The roof panel 3 and the fixed panel 4 are panels made of glass, for example, and the front garnish 5 and the side garnish 6 are panels made of resin, for example. A weatherstrip 36 (see FIG. 5) made of a rubber member or the like is attached to the edge of the roof panel 3, and a weatherstrip 37 (see FIG. 5) made of a rubber member or the like is attached to the front edge of the fixed panel 4. When the roof panel 3 is closed completely, the weatherstrip 36 is press contact with the weatherstrip 37, the front garnish 5 and the side garnish 6 with the weatherstrip 36 being elastically deformed.

Figure 3:
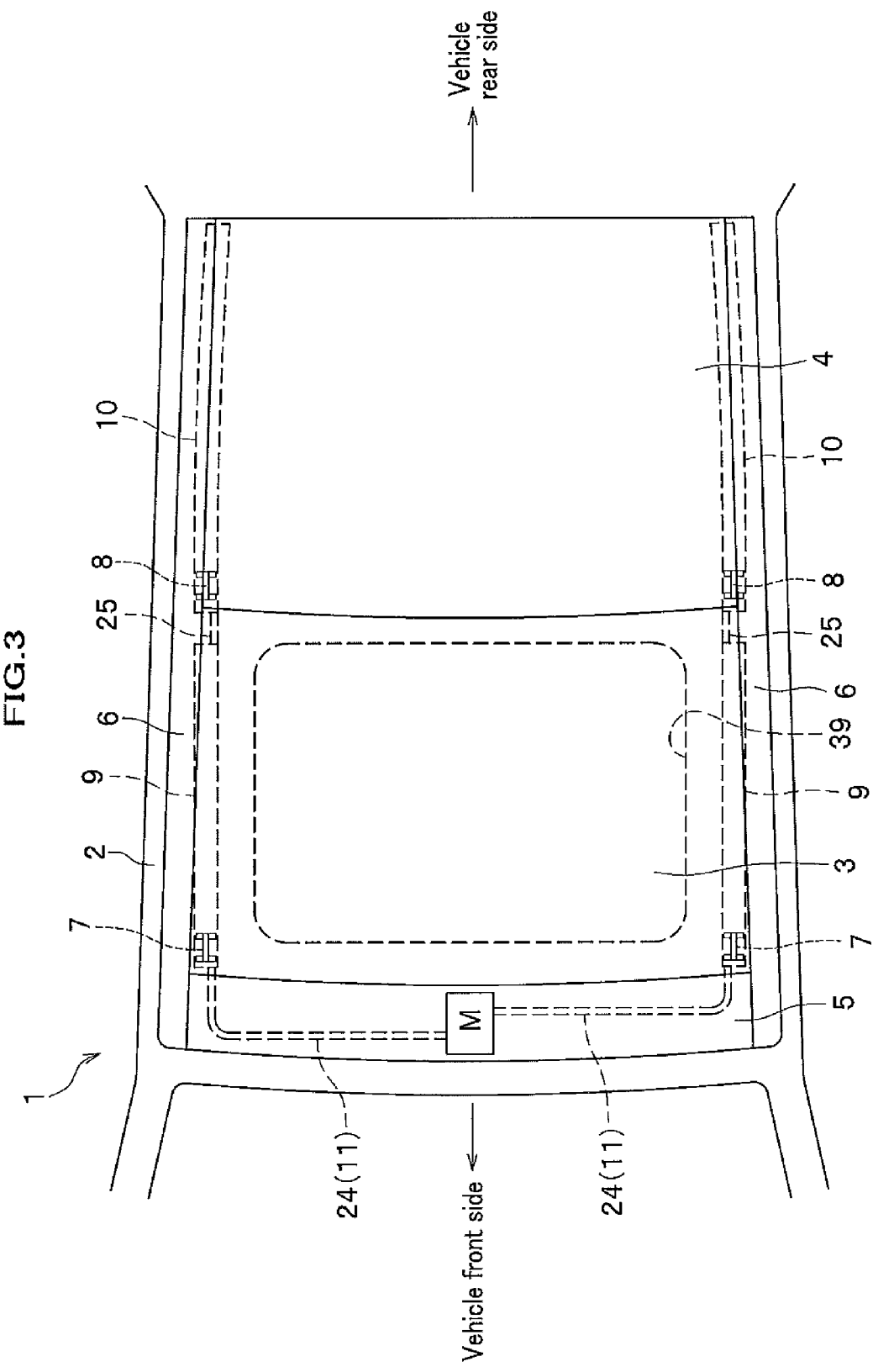
FIG. 3 is a plain view of the sunroof device of the present invention.
Figure 4:
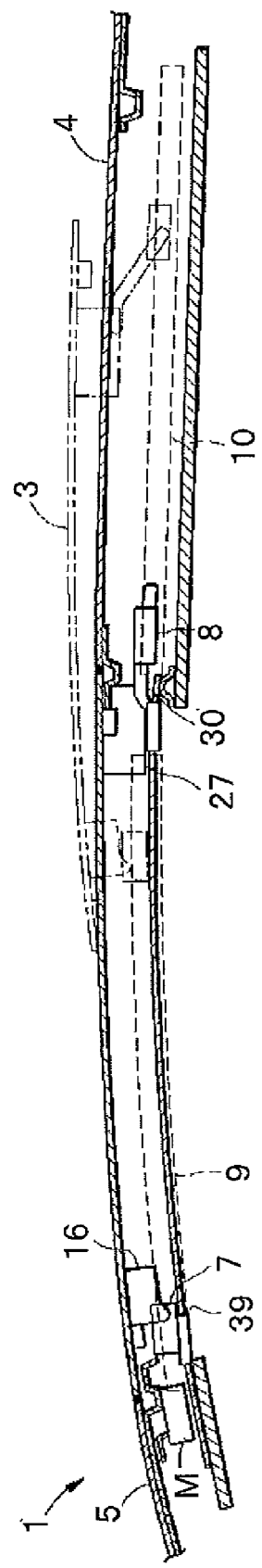
FIG. 4 is a side view of the sunroof device of the present invention.
Figure 11:
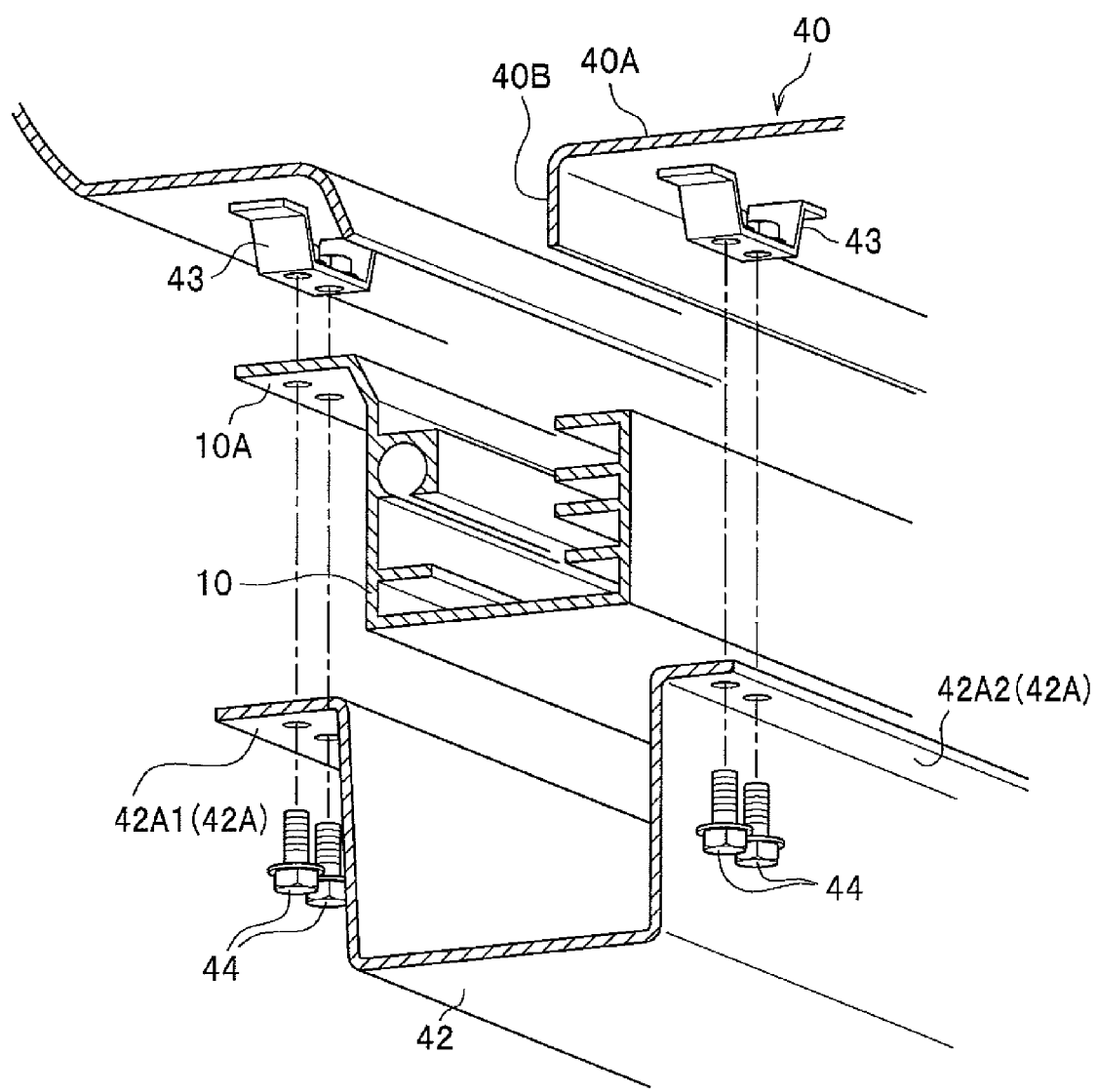
FIG. 11 is an external view showing a mounting structure of a guide rail.

The roof panel 3 is a comparatively large panel with heavy weight and is weight supported at the four corners of the roof panel 3 by left and right front sliders 7 and rear sliders 8 shown in FIG. 3 when the roof panel 3 is opened. A front guide rail 9 for guiding the slide of the front slider 7 is provided on the lower side of the side edges of the roof panel 3 in a closed state. A rear guide rail 10 for guiding the slide of the rear slider 8 is provided on the lower side of the side edges of the fixed panel 4. As shown in FIGS. 7B, 10 and 11, a horizontal rail flange 10A is formed at the upper edge of the rear guide rail 10 on the vehicle inner side. An indoor opening 39 having a little smaller outline than the roof panel 3 is formed below the roof panel 3 in the closed state as shown in FIG. 3.

Figure 6A:
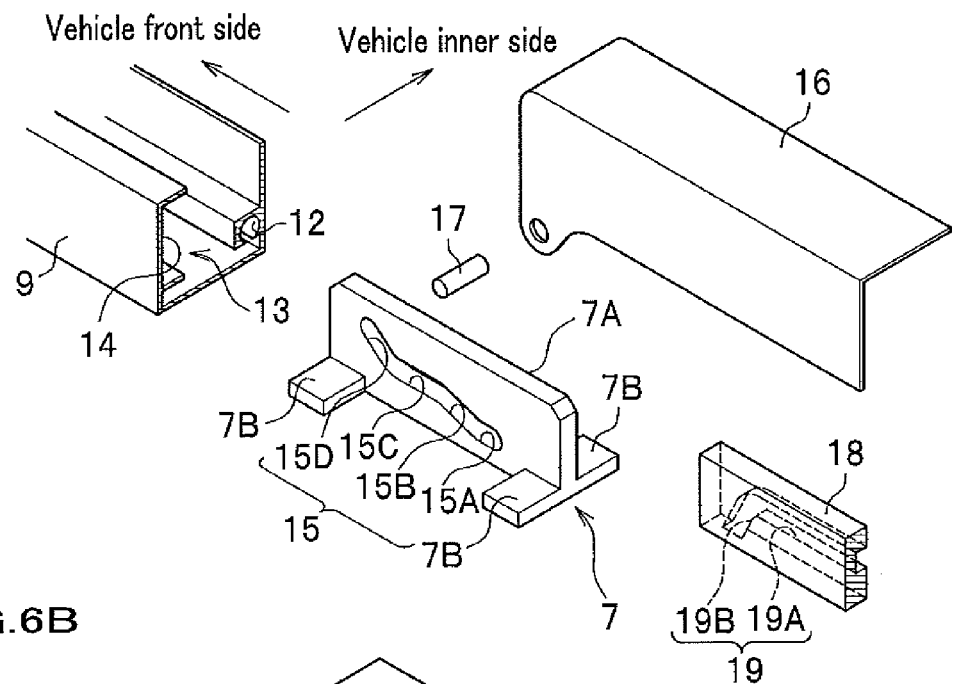
FIG. 6A is an exploded perspective view of a front slider and components around the front slider.
Figure 7A:
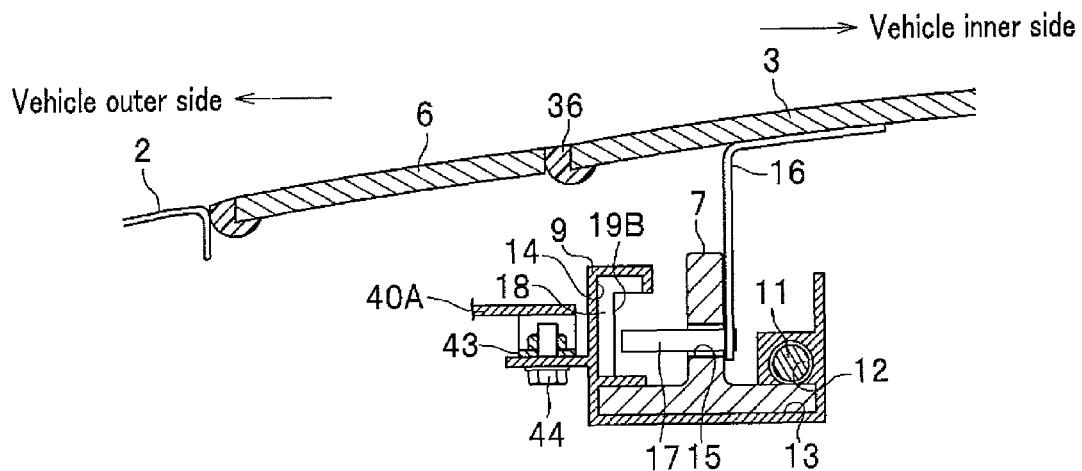
FIG. 7A is a cross sectional view of a front slider and components around the front slider.
Figure 7B:
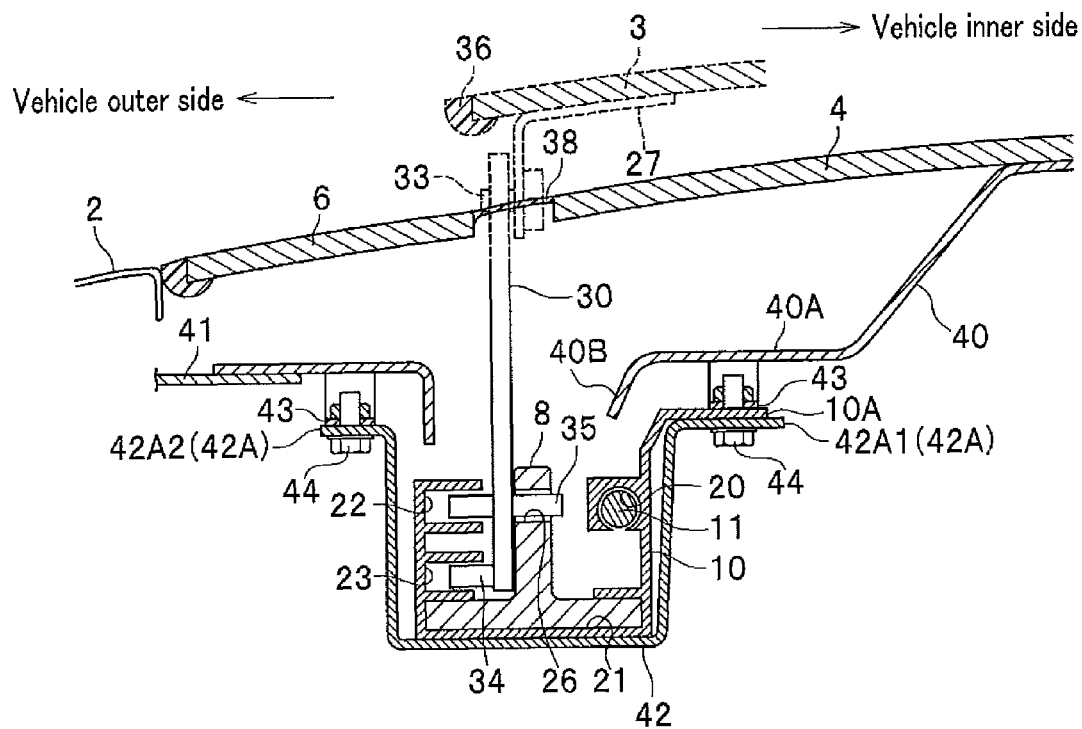
FIG. 7B is a cross sectional view of the rear slider and components around the rear slider.

As shown in FIGS. 6A and 7A, the front guide rail 9 includes a cable groove 12 through which a push/pull cable 11 (FIG. 7) is inserted which is moved frontward or rearward by the driving motor M (FIG. 3), a guide groove 13 for guiding a shoo 7B of the front slider 7 and a fitting groove 14 into which a first pin guide member 18 is fitted. The cable groove 12 is arranged in a comparatively lower position. The front guide rail 9 is comprised of an extruded member made, for example, of aluminum alloy. The front slider 7 is connected to the push/pull cable 11 via a connecting unit (not shown). The driving motor M is controlled to be rotated by a pulse control unit (not shown).

The front slider 7 includes a body 7A which is vertically elected along the front guide rail 9 and a plurality of shoes 7B protruding in the left or right direction from the lower part of the body 7A. The shoes 7B and the body 7A may be separated or may be formed integrally. A first lift guide groove 15 is formed in the body 7A such that the first lift guide groove 15 is bored through the body 7A in the left-right direction. As shown in FIG. 5, the first lift guide groove 15 includes a first horizontal stroke 15A which is horizontally extended at a rear part of the front slider 7, a first inclined stroke 15B which is gently inclined upward from the front end of the first horizontal stroke 15A, a second horizontal stroke 15C which is horizontally extended frontward from the upper end of the first inclined stroke 15B, a second inclined stroke 15D which is inclined upward from the front end of the second horizontal stroke 15C. The first horizontal stroke 15A constitutes a horizontal space for a position for a completely closed position of the roof panel 3, and the second horizontal stroke 15C constitutes a horizontal groove for a tilt-up completion position.

A first panel bracket 16 is fixed to the front part of the side edges of the roof panel 3 on the back side of the roof panel 3. As shown in FIGS. 6A and 7A, an end of the first lift guide pin 17 that is attached to the first panel bracket 16 such that its axial direction is the vehicle width direction is slidably engaged with the first lift guide groove 15. The first panel bracket 16 is comprised of a metallic plate such as a steel plate. The other end of the first lift guide pin 17 is also slidably engaged with a pin guide groove 19 formed in the first pin guide member 18. A pin guide member 18 is a member which is fixed in the fitting groove 14 of the front guide rail 9 The pin guide groove 19 includes a horizontal groove 19A along the front guide rail 9 and an inclined groove 19B which is inclined downward straight from the front end of the horizontal groove 19A.

In the embodiment, an end of the first lift guide pin 17 and the other end of the first lift guide pin 17 are engaged with the first lift guide groove 15 and the pin guide groove 19, respectively. Two pins which are separated from each other may be engaged with the first lift guide groove 15 and the pin guide groove 19, respectively.

As the first lift guide pin 17 and a first connection pin 33 (described later), a bolt, a nut or the like may be used. In FIG. 6A, the first lift guide pin 17 is simply described in a pin shape.

Figure 6B:
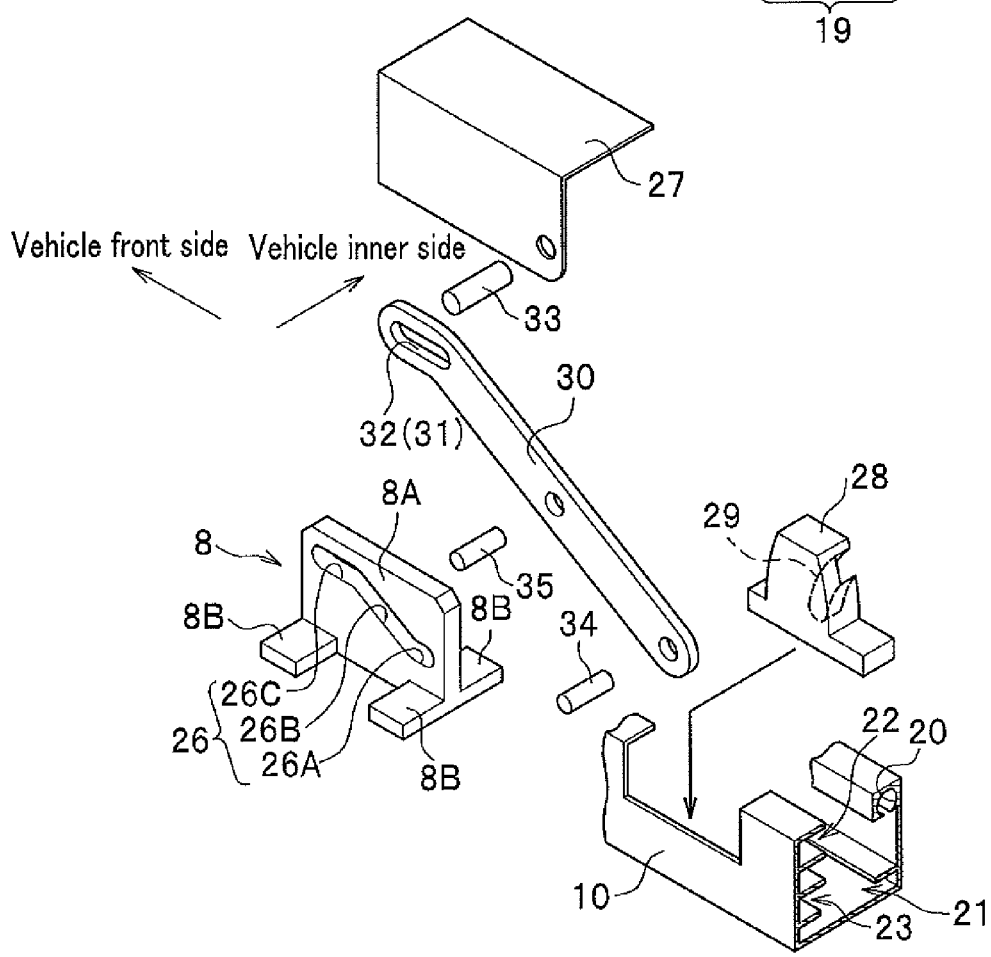
FIG. 6B is an exploded perspective view of a rear slider and components around the rear slider.

As shown in FIGS. 6B and 7B, the rear guide rail 10 includes a cable groove 20 through which the push/pull cable 11 is inserted, a guide groove 21 for guiding shoes 8B of the rear slider 8, an upper pin guide groove 22 for guiding a second lift guide pin 35, and a lower pin guide groove 23 which is formed on the lower side of the upper pin guide groove 22 for guiding the second connection pin 34. The cable groove 20 is arranged in the comparatively higher position and is arranged in a position higher than the cable groove 12 of the front guide rail 9. The rear guide rail 10 is comprised of an extruded member made of aluminum alloy, for example. The rear slider 8 is also connected to the push/pull cable 11 via a connection unit (not shown). The rear slider 8 is moved together with the front slider 7 via the push/pull cable 11.

Figure 12:
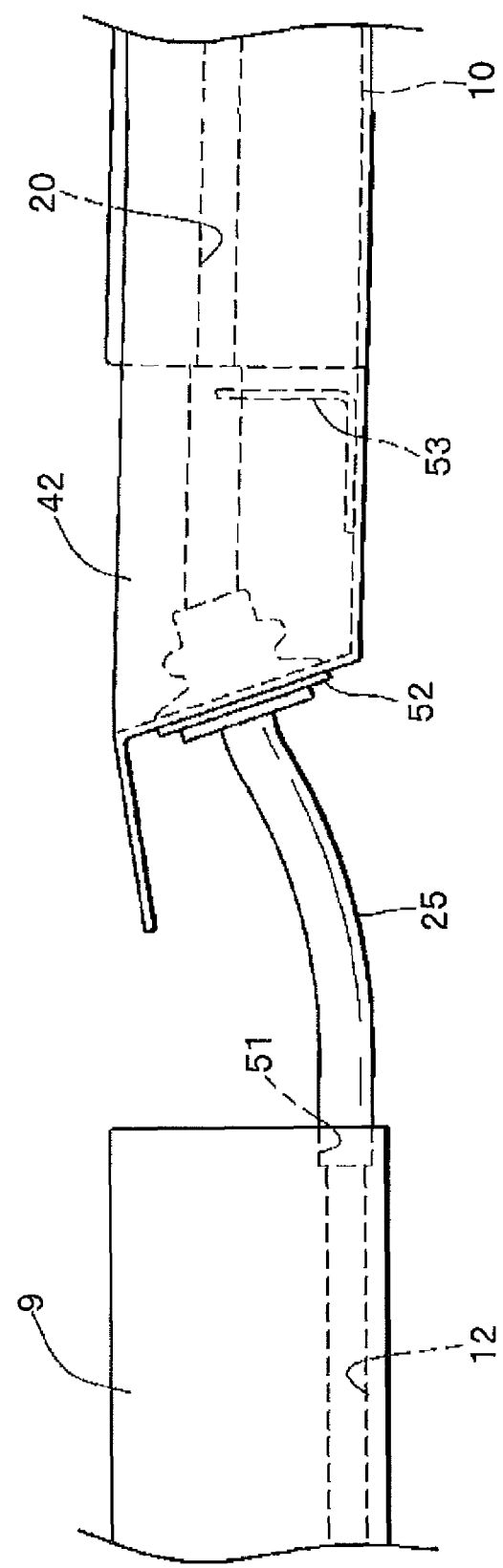
FIG. 12 is a side view showing a connection part of front and rear guide rails.

The push/pull cable 11 is guided by a guide pipe 24 between the motor M and the front guide rail 9 and is guided by a guide pipe 25 between the front guide rail 9 and the rear guide rail 10 as shown in FIG. 3. The guide pipe 25 is arranged to connect the rear end opening of the cable groove 12 of the front guide rail 9 to the front end opening of the cable groove 20 of the rear guide rail 10 as shown in FIG. 12. The guide pipe 25 is a steel pipe, for example.

More specifically, a fitting hole 51 whose diameter is larger than that of the cable groove 12 is bored at the rear end of the front guide rail 9. The front end of the guide pipe 25 is fit into the fitting hole 51, and the guide pipe 25 is connected to the front guide rail 9 in such a manner that the inner circumference of the cable groove 12 is flushed with the inner circumference of the guide pipe 25. On the other hand, the rear guide rail 10 is arranged inside of a drain cover 42 as described later. The guide pipe 25 is inserted into a circular sealing unit 52 provided on the front wall of the drain cover 42 and is connected to the front surface of the rear guide rail 10 in such a manner that the inner circumferential surface of the guide pipe 25 is flushed with the inner circumferential surface of the cable groove 20 with the guide pipe 25 being supported by a support angle 53 provided in the vicinity of the front end of the rear guide rail 10.

In the embodiment, the front guide rail 9 and the rear guide rail 10 are attached to a housing frame 40 as shown in FIGS. 7A, 7B and 10. The housing frame 40 is a rectangular frame member including a pair of side frame portions 40A; a front frame portion 40B which connects the front parts of the side frame portions 40A; a rear frame portion 40C which connects the rear parts of the side frame portions 40A as shown in FIG. 10. The housing frame 40 is fixed to a vehicle body frame 41 (FIG. 7B) by bolts (not shown). A front opening 40D that corresponds to the roof panel 3 is formed at the front side center of the housing frame 40. A rear opening 40E that corresponds to the fixed panel 4 is formed at the rear side center of the housing frame 40. A link opening 40F through which a link arm 30 is passed is formed in the side frame member 40A.

In addition to the front guide rail 9 and the rear guide rail 10, the fixed panel 4, the driving motor M, a shade apparatus (not shown) are attached to the housing frame 40. It is needless to say that the weight of the roof panel 3 is also applied to the housing frame 40. In short, the housing frame 40 is a core frame for ensuring the assembling rigidity of the entire unit of the sunroof device 1 and is made of a metallic plate such as a steel plate. The housing frame 40 may be one body in which the side frame portion 40A, the front frame portion 40B and the rear frame portion 40C are integrally formed as one sheet metal article. The housing frame 40 may be formed by connecting the side frame portions 40A, the front frame portion 40B and the rear frame portion 40C, each of which is formed separately, by welding or a bolt or the like.

The front guide rail 9 and the rear guide rail 10 are respectively connected to the front and rear sides of the lower surface of each side frame member 40A. As shown in FIGS. 7A, 7B and 11, a plurality of brackets 43 is attached to the lower side surface of the side frame member 40A by welding or the like. The rear guide rail 10 is detachably connected to the horizontal surface of the bracket 43 by the bolt 44 with the rail flange 10A being brought into contact with the horizontal surface of the bracket 43 from the lower side of the bracket 43. The upper end of the link arm 30 is passed through the link opening 40F and is connected to a second panel bracket 27 of the roof panel 3 with the first connection pin 33 as shown in FIG. 7B.

The rear guide rail 10 is fastened to the side frame member 40A together with the drain cover 42. As shown in FIG. 7B, there is a space between the fixed panel 4 and the side garnish 6 above the rear guide rail 10. The space is covered by a seal lip 38 when the roof panel 3 is closed. When the roof panel 3 is opened and the link arm 30 is passed through the space, however, the seal lip 38 is pushed upward and a local space is formed. Thus, a water drop or dust outside of the vehicle may be intruded from the local space. If it is designed that the rear guide rail 10 receives all of the water drop or the like which have fallen down, a dedicated drain groove must be provided to the rear guide rail 10, whereby the cross sectional shape of the rear guide rail 10 becomes complicated and the size of the rear guide rail 10 may disadvantageously become large. In contrast, with a structure in which the drain cover 42 that is a separate member is provided in such a manner that the drain cover 42 surrounds the rear guide rail 10, it is possible to suppress the increase of the arrangement space around the rear guide rail 10.

The drain cover 42 has a substantially but shape having horizontal cover flanges 42A at opposite edges of the upper opening of the drain cover 42 in a cross sectional view seen in the vehicle front-rear direction. With at least one of the cover flanges 42A being fastened to the side frame member 40A together with the rail flange 10A of the rear guide rail 10, the drain cover 42 is detachably attached to the side frame member 40A such that the drain cover 42 covers the opposite side surfaces and the bottom surface of the rear guide rail 10. In FIGS. 7B and 11, the cover flange 42A1 on the vehicle inner side is brought into contact with the rail flange 10A from the lower side of the rail flange 10A and is fastened to the bracket 43 with a bolt 44. The cover flange 42A2 on the vehicle outer side is brought into contact with the bracket 43 and is directly fastened to the bracket 43 with the bolt 44.

With the structure described above, a part of water drop or the like is dropped to the rear guide rail 10, and the rest of the water drop is all received reliably by the drain cover 42 and is drained outside through a drainpipe (not shown). A plurality of drain holes (not shown) may be formed in the rear guide rail 10 as needed, and water dropped in the rear guide rail 10 may be directed to flow into the drain cover 42 from the drain holes.

When the rear guide rail 10 is detached from the housing frame 40 fixed to the vehicle body frame 41 for the purpose of inspection or replacement of the rear slider 8 and the rear guide rail 10, the bolt 44 is unfastened to bring down the rear guide rail 10 and the drain cover 42 to some extent and the first connection pin 33 which connects the link arm 30 to the second panel bracket 27 is removed. Thus, the rear guide rail 10 can be removed from the housing frame 40 with the tilting mechanism such as the rear slider 8 and the link arm 30 being mounted on the rear guide rail 10.

With the structure described above, it is possible to inspect or replace the rear guide rail 10 by detachably connecting the rear guide rail 10 to the lower surface of the side frame member 40A with the bolt 44 while ensuring the rigidity of the entire sunroof device 1 by providing the housing frame 40 which is a rectangular frame including the pair of side frame portions 40A, the front frame portion 40B and the rear frame portion 40C.

Further, by providing the drain cover 42 which covers the opposite side surfaces and the bottom surface of the rear guide rail 10, the drain cover 42 is adapted to drain water drops which have fallen down. Therefore, the design flexibility of the cross sectional shape of the rear guide rail 10 is improved, and the cross sectional shape of the rear guide rail 10 can be simplified and downsized. Moreover, by fastening at least a part of the drain cover 42 and the rear guide rail 10 together to the housing frame 40 to detachably attach the drain cover 42 and the rear guide rail 10 to the housing frame, the number of bolts for fastening the drain cover 42 and the rear guide rail 10 can be made smaller, whereby the attaching/detaching work time can be shortened.

Next, the rear slider 8 includes a body 8A which vertically elects along the rear guide rail 10 and a plurality of shoes 8B, each of which protrudes in the left or right direction from the lower part of the body 8A as shown in FIG. 6B. The shoo 8B may be formed separately from the body 8A or formed integrally with the body 8A. In the body 8A, the second lift guide groove 26 is formed such that the second lift guide groove 26 is bored through the body 8A in the left and right direction. As shown in FIG. 5, the second lift guide groove 26 includes a first horizontal stroke 26A which extends horizontally at the rear part of the rear slider 8; an inclined stroke 26B which is inclined upward from the front end of the first horizontal stroke 26A; and a second horizontal stroke 26C which horizontally extends frontward from the upper end of the inclined stroke 26B. The first horizontal stroke 26A constitutes a horizontal groove for the completely-closed position of the roof panel 3 and the second horizontal stroke 26C constitutes a horizontal groove for a tilt-up completion position of the roof panel 3.

Here, the horizontal direction stroke a from a position where the first lift guide pin 17 is positioned when the roof panel is closed completely (a position shown in solid line in FIG. 5) to the rear end of the second horizontal stroke 15C is set longer than the horizontal direction stroke b from the position where the second lift guide pin 35 is positioned when the roof panel is closed completely (a position indicated by a solid line in FIG. 5) to the rear end of the second horizontal stroke 26C. It is to be noted that the positions where the first lift guide pin 17 and the second lift guide pin 35 are positioned when the roof panel 3 is completely tilted up are indicated by the virtual line in FIG. 5.

A second panel bracket 27 is fixed in the rear part of the side edge portion of the roof panel 3 on the back surface of the roof panel 3. The second panel bracket 27 is made of a metallic plate, such as a steel plate. As shown in FIG. 6B, a second pin guide member 28 is fixed to the rear guide rail 10 by using a cutout formed in a part of the rear guide rail 10, and an arch pin guide groove 29 is formed in the second pin guide member 28. The arch pin guide groove 29 is formed to be inclined downward in an arc shape from the middle of the upper pin guide groove 22 of the rear guide rail 10 when the second pin guide member 28 is fixed to the rear guide rail 10. The arch pin guide groove 29 is formed to be in an arc shape of which center approximately corresponds to a position where the second connection pin 34 is positioned when the roof panel 3 is closed completely.

The reference numeral 30 indicates a link arm of which one end is connected to the second panel bracket 27 with the link arm being rotatable about an axis in the vehicle width direction. The other end of the link arm is connected to the rear guide rail 10 with the link arm being rotatable about an axis in the vehicle width direction and being movable along the rear guide rail 10. A long hole 32 is bored through the front end of the link arm 30 as an escape groove 31, and the first connection pin 33 which is attached to the second panel bracket 27 is slidably engaged with the long hole 32. The second connection pin 34 which is attached to the rear end of the link arm 30 is slidably engaged with the lower pin guide groove 23 of the rear guide rail 10. A second lift guide pin 35 of which axis direction corresponds to the vehicle width direction is connected to the middle portion of the link arm 30 in its longitudinal direction. The second lift guide pin 35 is slidably engaged with the second lift guide groove 26, the arch pin guide groove 29 and the upper pin guide groove 22.

The other end of the link arm 30 may be rotatably connected to the rear slider 8 instead of the rear guide rail 10 (i.e. the other end of the link arm 30 may be rotatably connected to the rear slider 8 via the second connection pin 34).

"Effect"

Figure 8A:
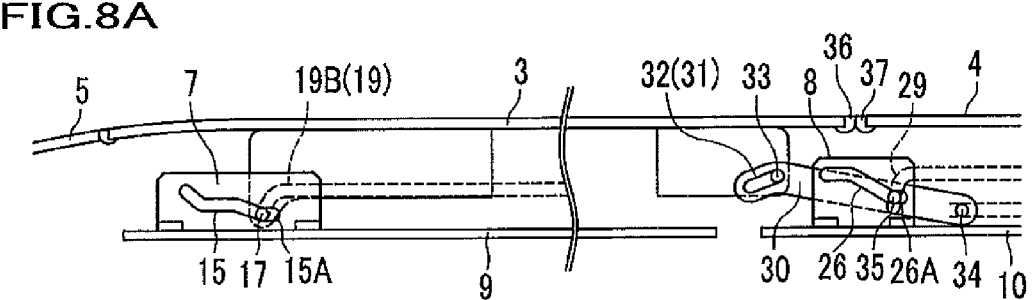
FIGS. 8A to 8D are side views of the sunroof device according to the present invention showing operation of the sunroof device.

Mainly referring to FIGS. 8A to 8D, the operation of the sunroof device 1 is described below. FIG. 8A shows a state of the sunroof device 1 in which the roof panel 3 is completely closed. In this state, the front slider 7 and the rear slider 8 are in the front-most positions. The first lift guide pin 17 is positioned in the first horizontal stroke 15A of the first lift guide groove and also in the lower part of the inclined groove 19B of the pin guide groove 19 The second lift guide pin 35 is positioned in the first horizontal stroke 26A of the second lift guide groove 26 and also in the lower part of the arch pin guide groove 29. The link arm 30 is stored with the link arm 30 being laid, and the first connection pin 33 is positioned at the rear end of the long hole 32.

Even if the roof panel 3 is displaced with respect to the pulse count value of the driving motor M due to an external load or the like, the displacement is absorbed by the lateral sliding movement of the first lift guide pin 17 in the first horizontal stroke 15A and the second lift guide pin 35 in the first horizontal stroke 26A since the first lift guide pin 17 and the second lift guide pin 35 are positioned in the first horizontal stroke 15A and the first horizontal stroke 26A that are both horizontal grooves. Similarly, even if there is an assembling error between the roof panel 3 and the front slider 7 and the rear slider 8, the error is absorbed by the lateral movement of the first lift guide pin 17 in the first horizontal stroke 15A and the second lift guide pin 35 in the first horizontal stroke 26A. Thus, the roof panel 3 is positioned in a regular totally-closed position without generating a positional variation in the up-down direction.

Figure 8B:
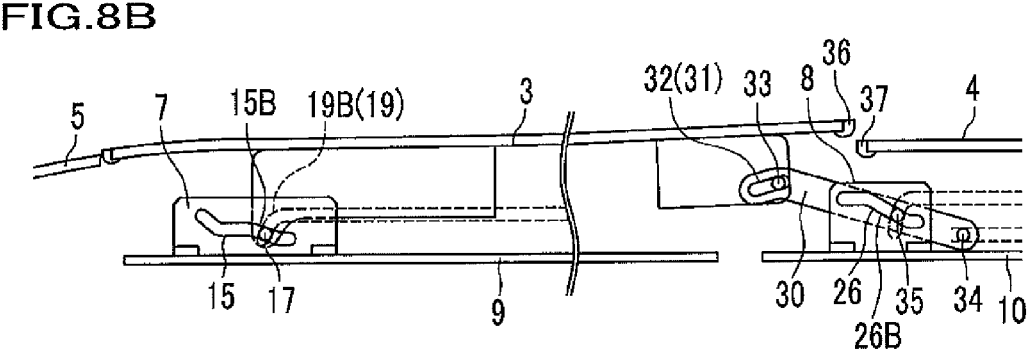

When the front slider 7 and the rear slider 8 are moved rearward together via the push/pull cable 11 by the operation of the motor M from the state shown in FIG. 8A, the front slider 7 raises the front part of the roof panel 3 in a first form by the movement of the front slider 7 relative to the roof panel 3 and the rear slider 8 raises the rear part of the roof panel 3 in a second form that is different from the first form by the movement of rear slider 8 relative to the roof panel 3. More specifically, as shown in FIG. 8B, the inner wall of the first inclined stroke 15B of the first lift guide groove 15 pushes up the first lift guide pin 17 and the inner wall of the inclined stroke 26B of the second lift guide groove 26 pushes up the second lift guide pin 35. Guided by the inclined groove 19B, the first lift guide pin 17 is raised while being displaced rearward a little. Guided by the arch pin guide groove 29, the second lift guide pin 35 is also raised while being displaced rearward a little. The roof panel 3 is raised in substantially parallel movement so that an opening is not formed between the roof panel 3 and the front garnish 5 at the initial stage of the tilt-up. As the arch pin guide groove 29 is formed in an arch shape of which center substantially corresponds to the position of the connecting pin 34 when the roof panel 3 is completely closed, the position of the second connection pin 34 hardly changes when the second lift guide pin 35 is raised in the arch shaped groove. Thus, the link arm 30 is raised with the second connection pin 34 that is in the substantially constant position being a rotation axis. During this operation, the first connection pin 33 is moved frontward in the long hole 32.

Figure 9A:
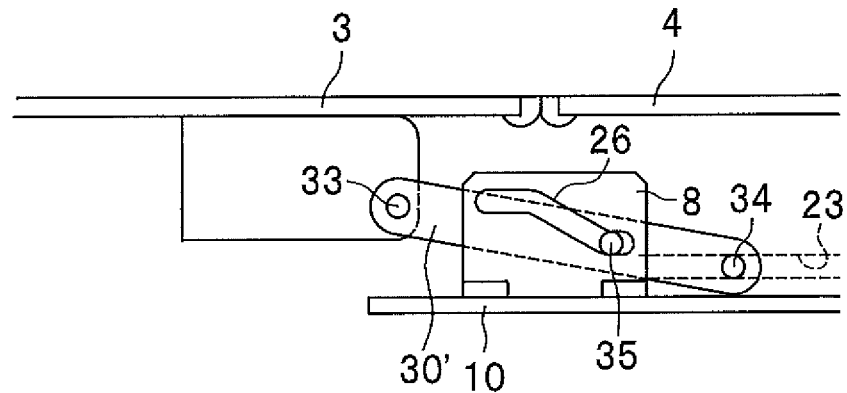
FIGS. 9A and 9B are illustrations showing, as a comparative example of the present invention, operation of the link arm in which an arch shape pin guide groove is not provided.
Figure 9B:
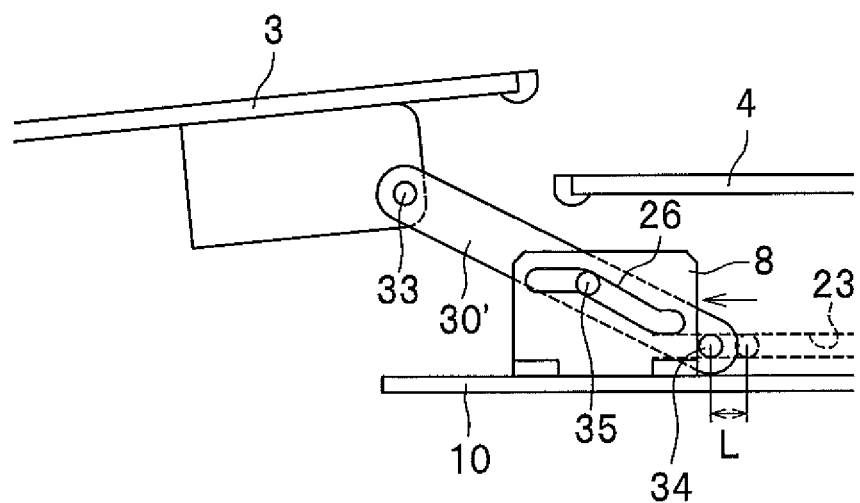

As described above, the rising movement of the link arm 30 can be made smooth by raising the link arm 30 with the second connection pin 34 that is in a substantially constant position being the rotation center. Here, an effect of a sunroof device is described below in which the arch pin guide groove 29 is not provided with reference to FIGS. 9A and 9B. In the sunroof device in which the arch pin guide groove 29 is not provided, the second connection pin 34 does not remain in a constant position but is pulled frontward as indicated by the reference symbol L when the second lift guide pin 35 is pushed by the inner wall of the second lift guide groove 26 with the movement of the rear slider 8 so that the link arm 30 is raised to the state shown in FIG. 9B from the state shown in FIG. 9A. In the structure in which the second connection pin 34 is moved frontward, the efficiency of converting the force of the second lift guide groove 26 pressing the second lift guide pin 35 to the force for pulling the second connection pin 34 is likely to be decreased at the final stage of the raising of the link arm 30'. Therefore, the link arm 30' may not be raised smoothly.

In contrast, with the structure of the present invention in which the arch pin guide groove 29 is formed in the rear guide rail 10 and the link arm 30 is raised or fallen down by making the arch pin guide groove 29 guide the link arm 30 with the second connection pin 34 whose position is made to be constant being a rotation center, the force of the second lift guide groove 26 for pressing the second lift guide pin 35 can be efficiently converted to the force for raising the link arm 30 without a need of the force for pulling the second connection pin 34 frontward. Thus, the link arm 30 can be smoothly raised from start to finish.

Further, by slidably engaging the first connection pin 33 with the escape groove 31 formed in the link arm 30, it is possible to smoothly absorb the difference between the arch shape movement trajectory of the first connection pin 33 with its rotation center being the second connection pin 34 that is a constant position and a desired rising trajectory of the rear edge of the roof panel 3. The same effect can be obtained in a structure where the first connection pin 33 is provided to the link arm 30 and the escape groove 31 is formed on the roof panel 3 (more specifically, on the second panel bracket 27).

As shown in FIG. 5, the horizontal direction stroke a on the side of the front slider 7 is set to be smaller than the horizontal direction stroke b on the side of the rear slider 8, and the timing at which the first lift guide pin 17 reaches to be positioned in the second horizontal stroke 15C is earlier than the timing at which the second lift guide pin 35 reaches to be positioned in the second horizontal stroke 26C, and thus the tilt-up operation time for the front edge of the roof panel 3 is shorter than that for the rear edge of the roof panel 3. This makes it possible to shorten the time in which the front edge of the roof panel 3 (more specifically, the weather strip 36) is rubbed with the front garnish 5, whereby the rubbing sound can be decreased and the damage to weatherstrip 36 can be also decreased.

Figure 8C:
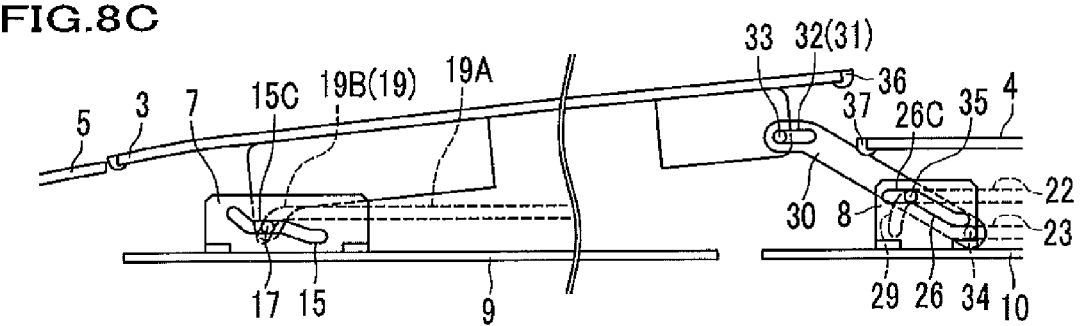

FIG. 8C shows a state where the roof panel 3 is finished being tilted up. In this state, the first lift guide pin 17 is positioned in the second horizontal stroke 15C of the first lift guide groove 15. At this time, the first lift guide pin 17 is positioned around the upper part of the inclined groove 19B of the pin guide groove 19 but does not reach the height of the horizontal groove 19A. On the other hand, the second lift guide pin 35 is positioned in the second horizontal stroke 26C of the second lift guide groove 26. At this time, the second lift guide pin 35 is positioned in the upper end of the arch pin guide groove 29. The position of the upper end of the arch pin guide groove 29 is the same height as that of the upper pin guide groove 22 of the rear guide rail 10.

Even if the roof panel 3 is displaced with respect to the pulse count value of the driving motor M due to an external load or the like, the displacement is absorbed by the lateral sliding movement of the first lift guide pin 17 in the second horizontal stroke 15C and the second lift guide pin 35 in the second horizontal stroke 26C because the first lift guide pin 17 and the second lift guide pin 35 are positioned in the second horizontal stroke 15C and the second horizontal stroke 26C that are both horizontal grooves. Similarly, even if there is an assembling error between the roof panel 3 and the front slider 7 and the rear slider 8, the error is absorbed by the lateral sliding movement of the first lift guide pin 17 in the second horizontal stroke 15C and the second lift guide pin 35 in the second horizontal stroke 26C. Thus, the roof panel 3 is positioned in a regular totally-closed position without generating a positional variation in the up-down direction. It is to be noted that, because the first lift guide pin 17 is positioned in the inclined groove 19B of the pin guide groove 19 when the roof panel 3 is completely tilted up as described above, the roof panel 3 is not displaced in the front-rear direction with respect to the front slider 7 and the rear slider 8.

Figure 8D:
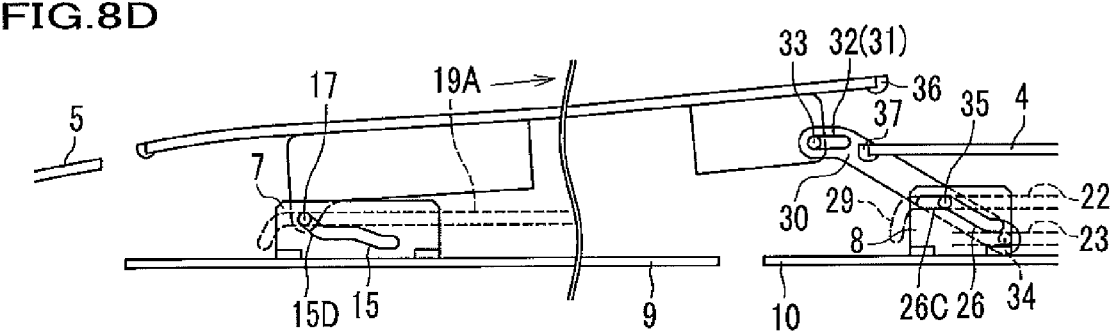

The inner wall of the second inclined stroke 15D of the first lift guide groove 15 pushes up the first lift guide pin 17 when the front slider 7 and the rear slider 8 are further moved rearward from the state shown in FIG. 8C. Guided by the inclined groove 19B, the first lift guide pin 17 is raised while being displaced rearward. When the first lift guide 17 is raised completely, the first lift guide 17 is then horizontally moved rearward, guided by the horizontal groove 19A as shown in FIG. 8D. On the other hand, the second lift guide pin 35 is pressed by the front end inner wall of the second horizontal stroke 26C of the second lift guide groove 26 and is guided by the upper pin guide groove 22 to be moved rearward horizontally. As the second connection pin 34 is also moved rearward horizontally, guided by the lower pin guide groove 23, the link arm 30 is horizontally moved rearward with its attitude being kept, supported by the two points of the second lift guide pin 35 and the second connection pin 34. In short, only a part of the roof panel 3 on the front edge side is raised from the state where the roof panel 3 is completely tilted up and the roof panel 3 is then moved rearward.

As described above, when the roof panel 3 is moved, the second panel bracket 27 and the link arm 30 pass through the gap between the fixed panel 4 and the side garnish 6 as shown in FIG. 7B. The second panel bracket 27 and the link arm 30 locally push aside the seal lip 38 covering the gap between the fixed panel 4 and the side garnish 6 when passing through the gap between the fixed panel 4 and the side garnish 6. The operation for closing the roof panel 3 is an operation opposite to the operation described above, and thus the description thereof is omitted.

In the operation described above, as the push/pull cable 11 is connected to both of the front slider 7 and the rear slider 8, the front slider 7 and the rear slider 8 reliably moves the roof panel 3 up and down, respectively, in a predetermined trajectory. Further, it is also possible to form the front guide rail 9 and the rear guide rail 10 in different members and make the cross sectional shapes of the front guide rail 9 and the rear guide rail 10 different from each other. Therefore, it is easy for the front guide rail 9 and the rear guide rail 10 to obtain the trajectory of the up-down movement of the sunroof panel 3 in the first form and that of the sunroof panel 3 in the second form, respectively. In addition, as the front guide rail 9 and the rear guide rail 10 are connected with the guide pipe 25, the shape of the push/pull cable 11 is kept. Thus, the distance between the front slider 7 and the rear slider 8 can be accurately kept constant. With the structure described above, the smooth tilting operation of the roof panel 3 can be realized.

Furthermore, as the seal lip 38 is provided above the rear guide rail 10, rain drops may be intruded even when the roof panel 3 is completely closed. However, by providing the cable groove 20 in a comparatively higher position, the push/pull cable 11 is prevented from being submerged in water. On the other hand, there is scarcely any risk of the ingress of water in the front guide rail 9 when the sunroof panel 3 is completely closed. Therefore, the cable groove 12 is provided in a comparatively lower position (more specifically a position close to the shoo 7B of the front slider 7), making the sliding resistance of the front slider 7 small. It appears there is a risk that the push/pull cable 11 may be splashed with water in a connection part on the front side of the rear guide rail 10, however, this is not the case since the push/pull cable 11 is covered by the guide pipe 25.

Figure 13A:
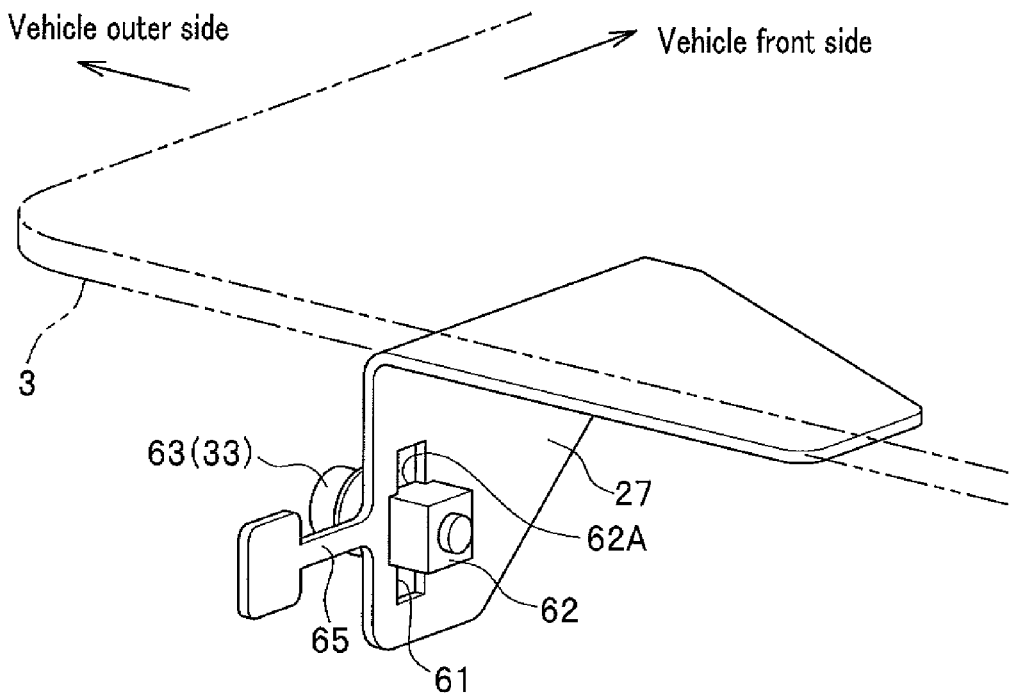
FIG. 13A is an external perspective view showing a height adjusting structure of the roof panel when the height adjusting structure is assembled.
Figure 13B:
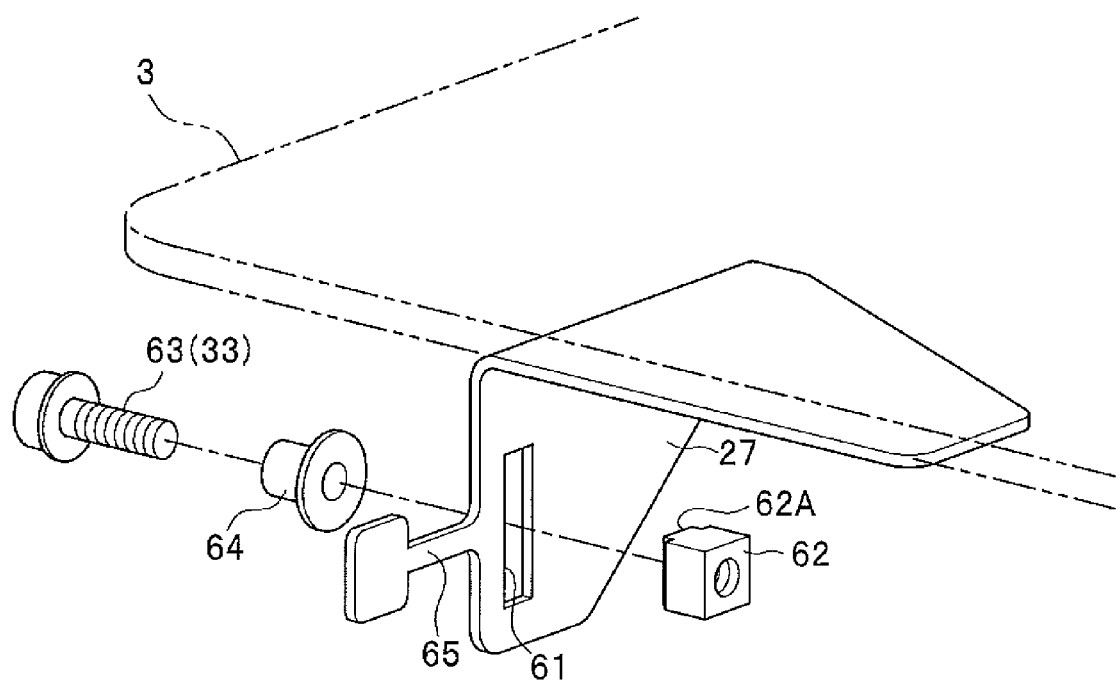
FIG. 13B is an external perspective view showing the height adjusting structure of the roof panel before the height adjusting structure is assembled.

As a structure for adjusting the height of the roof panel 3 when the sunroof device 1 is assembled, the sunroof device 1 includes a position adjusting long hole 61 that is bored through the second panel bracket 27 and is long in the up-down direction, a connecting nut 62 including an engaging protruded portion 62A that is slidably engaged with the position adjusting long hole 61, and a connecting bolt 63 as the first connection pin 33 that is screwed to the connecting nut 62 for fastening the second panel bracket 27 as shown in FIG. 13.

The connecting nut 62 is formed, for example, in a rectangular shape. Formed on a surface of the connecting nut 62 being in contact with a surface of the second panel bracket 27 is an engaging protruded portion 62A that is formed in a thin rectangular shape and has a protruded size within a plate thickness of the second panel bracket 27 and has substantially the same width as that of the position adjusting long hole 61. The connecting bolt 63 is screwed to the connecting nut 62 through the position adjusting long hole 61 from the other surface of the second panel bracket 27 to be fixed to the second panel bracket 27. The reference numeral 64 indicates a collar which is interposed between the screw part of the connecting bolt 63 and the long hole 32 (FIG. 5) of the link arm 30.

In accordance with the structure described above, a worker slidably engages the engaging protruded portion 62A with the position adjusting long hole 61, brings the connecting nut 62 in contact with the second panel bracket 27 and screws the connecting bolt 63 to the connecting nut 62 through the long hole 32 (FIG. 5) of the link arm 30 to the extent the connecting bolt 63 is temporarily fastened to the connecting nut 62. As the width of the engaging protruded portion 62A is substantially the same as that of the position adjusting long hole 61, the engaging protruded portion 62A is prevented from being rattled in the width direction of the position adjusting long hole 61 (i.e. the front-rear direction of the vehicle) when the engaging protruded portion 62A is slid. The engaging protruded portion 62A is slid in the up-down direction in the position adjusting long hole 61 so that the roof panel 3 in a completely-closed state is in the height at which the roof panel 3 is smoothly continued to the fixed panel 4. Once the height position is determined, the connecting bolt 63 is finally tightened. With this assembly structure, the height of the roof panel 3 can be more easily adjusted than with a conventional height adjusting method using a shim.

Figure 14:
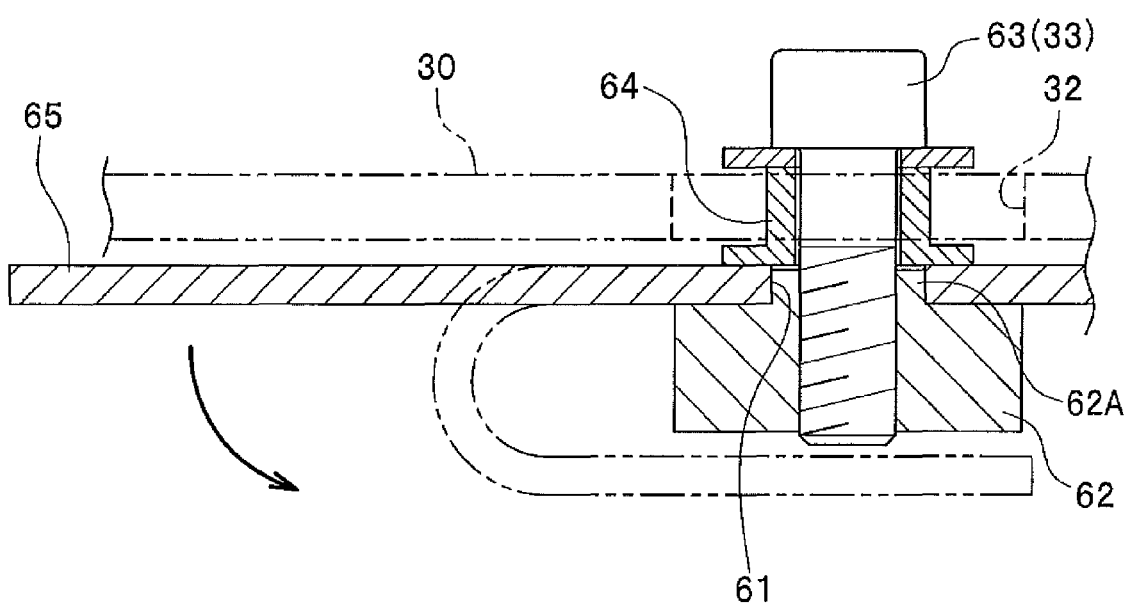
FIG. 14 is a plain cross sectional view of the height adjusting structure of the roof panel.

Further, in order to more easily adjust the height position of the sunroof panel 3, the second panel bracket 27 is provided with a bent piece part 65 which is bent after the engaging protruded portion 62A of the connecting nut 62 is slidably engaged with the position adjusting long hole 61 so as to prevent the connecting nut 62 from being dropped off from the position adjusting long hole 61. The bent piece part 65 is formed in a stripe shape extending from the edge of the second panel bracket 27 with the bent piece part 65 being on the same plane as the second panel bracket 27 before the bent piece part 65 is bent. The bent piece part 65 is bent in a U shape as indicated by the virtual line in FIG. 14, by a nipper or the like after the engaging protruded portion 62A of the connecting nut 62 is slidably engaged with the position adjusting long hole 61 so that the distal end of the bent piece part 65 are positioned back of the connecting nut 62 to prevent the connecting nut 62 from being dropped off from the position adjusting long hole 61.

If the bent piece part 65 is not provided, a worker needs to hold the connecting nut 62 with one of his hands and to screw the connecting bolt 63 with the other one of his hands when the connecting bolt 63 is screwed into the connecting nut 62. By providing the bent piece part 65, however, the worker does not need to hold the connecting nut 62, whereby an assembling work is made easier. This is especially effective if the connecting nut 62 is positioned in a narrow space where the worker is difficult to reach his hands.

In the above description, the height adjusting structure according to the present invention is applied to the first connection pin 33 that is attached to the second panel bracket 27 on the rear side of the sunroof panel 3 where an assembling error is easy to be generated because of its large ascending displacement. However, the height adjusting structure may be applied to the first lift guide pin 17 attached to the first panel bracket 16 on the front part of the sunroof panel 3 as appropriate. In this case, the position adjusting long hole 61 is formed in the first panel bracket 16.

The shape of the connecting nut 62 is not limited to a rectangular but may be a circular cylinder or the like.

A preferred embodiment of the present invention has been described as above, however, the present invention may be modified variously without limited to the embodiment shown in the accompanying drawings without deviating from the spirit of the present invention. For example, if the front edge of the roof panel 3 is designed to ascend largely, the link arm 30 of the present invention may be provided to the front slider 7.

What is claimed is:

1. A sunroof device comprising:
   a roof panel which is provided to a fixed roof of a vehicle with the roof panel being openable/closable;
   a front slider and a rear slider which are connected to a front part of the roof panel and a rear part of the roof panel, respectively, through pin engaging units each of which is comprised of a lift guide groove and a lift guide pin which is slid along the lift guide groove, wherein the front slider and the rear slider are moved together to tilt up the roof panel by pressing action of the pin engaging units, and
   a driving motor which drives the front slider and the rear slider, wherein
   the lift guide groove of each pin engaging unit includes in a part thereof a horizontal groove for a tilt up completion position, and
   the lift guide pin of each point engaging unit is positioned in the horizontal groove when the roof panel is completely tilted up,
   wherein a horizontal stroke of the lift guide pin on a side of the front slider is set to be smaller than that of the lift guide pin on a side of the rear slider, the horizontal stroke of each lift guide pin being a stroke from a position when the roof panel is completely closed to a rear end of each of the horizontal groove, and
   the lift guide pin on the side of the front slider is positioned in the horizontal groove earlier than the lift guide pin on the side of the rear slider when the roof panel is being tilted up, and
   wherein the sunroof device further comprises:
   a rear guide rail which guides the rear slider; and
   a link arm of which one end is rotatably connected to the roof panel via a first connecting pin and of which the other end is rotatably connected to the rear guide rail via a second connecting pin, wherein a mid portion of the link arm is slidably engaged with the lift guide groove of the rear slider via a respective lift guide pin, wherein
   the lift guide groove of the rear slider presses the lift guide pin by the movement of the rear slider to raise or lay down the link arm, and wherein
   the rear guide rail includes an arch shape pin guide groove of which rotation center is approximately a position of the second connecting pin when the roof panel is completely closed, and
   the link arm is rotated to be raised or laid with its rotation center being the second connecting pin which is at a constant position, guided by the arch shape pin guide groove.

2. A sunroof device, comprising:
   a roof panel which is provided to a fixed roof of a vehicle with the roof panel being openable/closable;
   a front slider and a rear slider which are connected to a front part of the roof panel and a rear part of the roof panel, respectively, through pin engaging units each of which is comprised of a lift guide groove and a lift guide pin which is slid along the lift guide groove, wherein the front slider and the rear slider are moved together to tilt up the roof panel by pressing action of the pin engaging units, and
   a driving motor which drives the front slider and the rear slider,
   wherein the lift guide groove of each pin engaging unit includes in a part thereof a horizontal groove for a tilt up completion position, and
   the lift guide pin of each point engaging unit is positioned in the horizontal groove when the roof panel is completely tilted up, and
   wherein the sunroof device further comprises:
   a rear guide rail which guides the rear slider; and
   a link arm of which one end is rotatably connected to the roof panel via a first connecting pin and of which the other end is rotatably connected to the rear guide rail via a second connecting pin, wherein a mid portion of the link arm is slidably engaged with the lift guide groove of the rear slider via a lift guide pin, wherein
   the lift guide groove of the rear slider presses the lift guide pin by the movement of the rear slider to raise or lay down the link arm, and wherein
   the rear guide rail includes an arch shape pin guide groove of which center is approximately a position of the second connecting pin when the roof panel is completely closed, and
   the link arm is rotated to be raised or laid with its rotation center being the second connecting pin which is at a constant position, guided by the arch shape pin guide groove.

3. The sunroof device according to claim 2, wherein the first connecting pin is slidably engaged with an escape groove which is formed in the link arm.

4. The sunroof device according to claim 1, wherein the first connecting pin is slidably engaged with an escape groove which is formed in the link arm.

5. The sunroof device according to claim 1, further comprising:
   a pair of left and right rear guide rails which guide the rear slider; and
   a housing frame including a pair of side frame portions, a front frame portion which connects front ends of the side frame portions and a rear frame portion which connects rear ends of the side frame portions, the housing frame being fixed to a vehicle body frame; wherein
   the rear guide rail is detachably attached to a bottom surface of each side frame portion of the housing frame by fastening a bolt.

6. The sunroof device according to claim 1, further comprising:
   a pair of left and right rear guide rails which guide the rear slider; and
   a housing frame including a pair of side frame portions, a front frame portion which connects front ends of the side frame portions and a rear frame portion which connects rear ends of the side frame portions, the housing frame being fixed to a vehicle body frame; wherein the rear guide rail is detachably attached to a bottom surface of each side frame portion of the housing frame by fastening a bolt.

7. The sunroof device according to claim 5, further comprising a drain cover which is detachably attached to the housing frame such that the drain cover covers opposite side surfaces and a bottom surface of the rear guide rail, wherein the drain cover is formed in a substantially hat shape having cover flanges on opposite edges of an upper opening of the drain cover, wherein at least one of the cover flanges is fastened to the housing frame together with a rail flange formed in the rear guide rail.

8. The sunroof device according to claim 6, further comprising a drain cover which is detachably attached to the housing frame such that the drain cover covers opposite side surfaces and a bottom surface of the rear guide rail, wherein the drain cover is formed in a substantially hat shape having cover flanges on opposite edges of an upper opening of the drain cover, wherein at least one of the cover flanges is fastened to the housing frame together with a rail flange formed in the rear guide rail.

9. The sunroof device according to claim 5, further comprising a link arm of which one end is rotatably connected to the roof panel via a first connecting pin, wherein the rear guide rail is removed from the housing frame with the rear slider being mounted on the rear guide rail by removing the first connecting pin.

10. The sunroof device according to claim 6, further comprising a link arm of which one end is rotatably connected to the roof panel via a first connecting pin, wherein the rear guide rail is removed from the housing frame with the rear slider being mounted on the rear guide rail by removing the first connecting pin.

11. The sunroof device according to claim 7, further comprising a link arm of which one end is rotatably connected to the roof panel via a first connecting pin, wherein the rear guide rail is removed from the housing frame with the rear slider being mounted on the rear guide rail by removing the first connecting pin.

12. The sunroof device according to claim 8, further comprising a link arm of which one end is rotatably connected to the roof panel via a first connecting pin, wherein the rear guide rail is removed from the housing frame with the rear slider being mounted on the rear guide rail by removing the first connecting pin.

13. A sunroof device, comprising:

a roof panel which is provided to a fixed roof of a vehicle with the roof panel being openable/closable;

a front slider and a rear slider which are connected to a front part of the roof panel and a rear part of the roof panel, respectively, through pin engaging units each of which is comprised of a lift guide groove and a lift guide pin which is slid along the lift guide groove, wherein the front slider and the rear slider are moved together to tilt up the roof panel by pressing action of the pin engaging units, and a driving motor which drives the front slider and the rear slider, wherein the lift guide groove of each pin engaging unit includes in a part thereof a horizontal groove for a tilt up completion position, and the lift guide pin of each point engaging unit is positioned in the horizontal groove when the roof panel is completely tilted up, and wherein the sunroof device further comprises:

a front guide rail which guides the front slider;

a rear guide rail which guides the rear slider; and a push/pull cable which is inserted through each cable guide groove of the front guide rail and the rear guide rail and is pushed or pulled by the driving motor, wherein the push/pull cable is connected to both of the front slider and the rear slider, and a connection pipe which connects the cable guide grooves and covers the push/pull cable is provided between the front guide rail and the rear guide rail.

14. A sunroof device, comprising:

a roof panel which is provided to a fixed roof of a vehicle with the roof panel being openable/closable;

a front slider and a rear slider which are connected to a front part of the roof panel and a rear part of the roof panel, respectively, through pin engaging units each of which is comprised of a lift guide groove and a lift guide pin which is slid along the lift guide groove, wherein the front slider and the rear slider are moved together to tilt up the roof panel by pressing action of the pin engaging units, and a driving motor which drives the front slider and the rear slider, wherein the lift guide groove of each pin engaging unit includes in a part thereof a horizontal groove for a tilt up completion position, and the lift guide pin of each point engaging unit is positioned in the horizontal groove when the roof panel is completely tilted up, wherein a horizontal stroke of the lift guide pin on a side of the front slider is set to be smaller than that of the lift guide pin on a side of the rear slider, the horizontal stroke of each lift guide pin being a stroke from a position when the roof panel is completely closed to a rear end of each of the horizontal groove, and the lift guide pin on the side of the front slider is positioned in the horizontal groove earlier than the lift guide pin on the side of the rear slider when the roof panel is being tilted up, and wherein the sunroof device further comprises:

a front guide rail which guides the front slider;

a rear guide rail which guides the rear slider; and a push/pull cable which is inserted through each cable guide groove of the front guide rail and the rear guide rail and is pushed or pulled by the driving motor, wherein the push/pull cable is connected to both of the front slider and the rear slider, and a connection pipe which connects the cable guide grooves and covers the push/pull cable is provided between the front guide rail and the rear guide rail.

15. The sunroof device according to claim 13, wherein the cable guide groove of the front guide rail is provided at a position lower than the cable guide groove of the rear guide rail.

16. The sunroof device according to claim 14, wherein the cable guide groove of the front guide rail is provided at a position lower than the cable guide groove of the rear guide rail.

17. The sunroof device according to claim 1, wherein a panel bracket is attached to a lower surface of the roof panel, and the roof panel is connected to the rear slider via a connecting pin attached to the panel bracket, the sunroof device further comprising:

a position adjusting long hole which is bored through the panel bracket and is long in an up-down direction;

a connecting nut including an engaging protruded portion which is slidably engaged with the position adjusting long hole; and a connecting bolt as the connecting pin which is screwed into the connecting nut to fasten the panel bracket to the roof panel.

18. The sunroof device according to claim 2, wherein a panel bracket is attached to a lower surface of the roof panel, and the roof panel is connected to the rear slider via a connecting pin attached to the panel bracket, the sunroof device further comprising:

a position adjusting long hole which is bored through the panel bracket and is long in an up-down direction;

a connecting nut including an engaging protruded portion which is slidably engaged with the position adjusting long hole; and a connecting bolt as the connecting pin which is screwed into the connecting nut to fasten the panel bracket to the roof panel.

19. The sunroof device according to claim 17, wherein the panel bracket is provided with a bent piece portion which is bent after the connecting nut is slidably engaged with the position adjusting long hole to prevent the connecting nut from being dropped off.

20. The sunroof device according to claim 18, wherein the panel bracket is provided with a bent piece portion which is bent after the connecting nut is slidably engaged with the position adjusting long hole to prevent the connecting nut from being dropped off.

21. A sunroof device comprising:

a roof panel which is provided to a fixed roof of a vehicle with the roof panel being openable/closable;

a front slider and a rear slider which are connected to a front part of the roof panel and a rear part of the roof panel, respectively, through pin engaging units each of which is comprised of a lift guide groove and a lift guide pin which is slid along the lift guide groove, wherein the front slider and the rear slider are moved together to tilt up the roof panel by pressing action of the pin engaging units, and a driving motor which drives the front slider and the rear slider, wherein the lift guide groove includes in a part thereof a horizontal groove for a tilt up completion position, and the sunroof device further comprising pin guide members each of which includes a pin guide groove having a groove inclined downward forward, wherein at least one of the lift guide pin is slidably engaged with the pin guide groove, and wherein the roof panel is positioned relative to the front slider and the rear slider by positioning the lift guide pin in the horizontal groove and by positioning the at least one of the lift guide pin which is engaged with the pin guide groove of the pin guide member in the groove inclined downward forward when the roof panel is completely tilted up.

* * * * *